US012713402B2

(12) United States Patent
Bai et al.

(10) Patent No.: US 12,713,402 B2
(45) Date of Patent: Aug. 18, 2026

(54) TECHNIQUES FOR TRANSMISSION CONFIGURATION INDICATOR (TCI) STATE INDICATION FOR COMPONENT CARRIERS IN DIFFERENT MODES

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 18/316,756

(22) Filed: May 12, 2023

(65) Prior Publication Data

US 2024/0057037 A1 Feb. 15, 2024

Related U.S. Application Data

(60) Provisional application No. 63/397,697, filed on Aug. 12, 2022.

(51) Int. Cl.
*H04W 72/02* (2009.01)
*H04W 72/0453* (2023.01)

(52) U.S. Cl.
CPC ....... *H04W 72/02* (2013.01); *H04W 72/0453* (2013.01)

(58) Field of Classification Search
CPC .. H04W 72/02; H04W 72/0453; H04B 7/024; H04B 7/0695; H04L 5/0053; H04L 5/0023; H04L 5/0037; H04L 5/001
See application file for complete search history.

(56) References Cited

U.S. PATENT DOCUMENTS

| | | | | |
|---|---|---|---|---|
| 2020/0205088 | A1* | 6/2020 | Yang | H04W 72/12 |
| 2021/0378004 | A1* | 12/2021 | Cirik | H04L 5/005 |
| 2021/0385807 | A1 | 12/2021 | Rahman et al. | |
| 2022/0173848 | A1* | 6/2022 | Guan | H04B 7/0695 |
| 2022/0224459 | A1 | 7/2022 | Venugopal et al. | |
| 2022/0263616 | A1* | 8/2022 | Farag | H04L 5/0023 |
| 2024/0048318 | A1* | 2/2024 | Zhang | H04L 5/0048 |
| 2024/0178978 | A1* | 5/2024 | Yao | H04L 5/0053 |
| 2024/0405946 | A1* | 12/2024 | Matsumura | H04W 72/232 |
| 2025/0015965 | A1* | 1/2025 | Yang | H04L 5/0048 |

OTHER PUBLICATIONS

International Search Report and Written Opinion—PCT/US2023/070525—ISA/EPO—Nov. 27, 2023.

(Continued)

*Primary Examiner* — Yu-Wen Chang
(74) *Attorney, Agent, or Firm* — Arent Fox LLP/Qualcomm Incorporated

(57) ABSTRACT

Aspects described herein relate to configuring, activating, or indicating transmission configuration indicator (TCI) states for component carriers (CCs) operating in different modes that may relate to different numbers of TCI pools being configured for the CCs.

29 Claims, 11 Drawing Sheets

(56) References Cited

OTHER PUBLICATIONS

VIVO: "Views on Unified TCI Framework Extension for Multi-TRP", 3GPP TSG RAN WG1 #109-e, R1-2203541, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 20 Pages, XP052153016, Section 2, Section 2.1, Section 2.2.2, Section 2.4, Sections 1-3, Figures 4-5.

ZTE: "Further Details on Multi-Beam and Multi-TRP Operation", 3GPP TSG RAN WG1 Meeting #102-e, R1-2005461, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, 8 Pages, XP052346834, Section 2, Sections 1-4.

* cited by examiner

TECHNIQUES FOR TRANSMISSION CONFIGURATION INDICATOR (TCI) STATE INDICATION FOR COMPONENT CARRIERS IN DIFFERENT MODES

CLAIM OF PRIORITY UNDER 35 U.S.C. § 119

The present Application for Patent claims priority to Provisional Patent Application No. 63/397,697, entitled “TECHNIQUES FOR TRANSMISSION CONFIGURATION INDICATOR (TCI) STATE INDICATION FOR COMPONENT CARRIERS IN DIFFERENT MODES” filed Aug. 12, 2022, which is assigned to the assignee hereof and hereby expressly incorporated by reference herein for all purposes.

FIELD OF THE DISCLOSURE

Aspects of the present disclosure relate generally to wireless communication systems, and more particularly, to techniques for indicating transmission configuration indicator (TCI) states for component carriers (CCs) operating in different modes.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication is provided that includes receiving a reference component carrier (CC) configuration for a reference CC based on a first set of transmission/reception points (TRPs) including one or more of a first TRP or a second TRP, receiving a second CC configuration for a second CC based on a second set of TRPs including one or more of the first TRP or the second TRP, receiving, for the reference CC, a transmission configuration indicator (TCI) pool configuration for using the reference CC in a first mode, wherein the TCI pool configuration includes one or more TCI pools for at least one of the first TRP or the second TRP, and where the second CC is used in a second mode associated with a different number of TCI pools than the first mode for using the reference CC, configuring the second CC, based on the second mode, with a subset of the one or more TCI pools.

In another aspect, a method for wireless communication is provided that includes transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, a TCI pool configuration for using the reference CC in a first mode, where the TCI pool configuration includes one or more TCI pools for at least one of the first TRP or the second TRP, and where the second CC is used in a second mode associated with a different number of TCI pools than the first mode for using the reference CC, configuring the second CC, based on the second mode, with a subset of the one or more TCI pools.

In another aspect, a method for wireless communication is provided that includes receiving a reference CC configuration for a reference CC based on a first set of TRPs including at least one of a first TRP or a second TRP, receiving a second CC configuration for a second CC based on a second set of TRPs including at least one of the first TRP or the second TRP, receiving, for the reference CC, a TCI pool configuration for using the reference CC in a first mode, where the TCI pool configuration includes at least one of a first TCI pool or a second TCI pool for at least one of the first TRP or the second TRP, and configuring, based on the TCI pool configuration for the reference CC, at least one of the first TCI pool or the second TCI pool for the second CC, where the second CC uses a second mode that is different from the first mode.

In another aspect, a method for wireless communication is provided that includes transmitting a reference CC configuration for a reference CC based on a first set of TRPs including at least one of a first TRP or a second TRP, transmitting a second CC configuration for a second CC based on a second set of TRPs including at least one of the first TRP or the second TRP, transmitting, for the reference CC, a TCI pool configuration for using the reference CC in a first mode, where the TCI pool configuration includes at least one of a first TCI pool or a second TCI pool for at least one of the first TRP or the second TRP, and configuring, based on the TCI pool configuration for the reference CC, at least one of the first TCI pool or the second TCI pool for the second CC, where the second CC uses a second mode that is different from the first mode.

In another aspect, a method for wireless communication is provided that includes receiving a reference CC configuration for a reference CC based on a first set of TRPs including one or more of a first TRP or a second TRP, receiving a second CC configuration for a second CC based on a second set of TRPs including one or more of the first TRP or the second TRP, receiving, for the reference CC, an activation command to activate a subset of TCI states in at least one of a first TCI pool or a second TCI pool for at least one of the first TRP or the second TRP for using a first mode on the reference CC, and activating, for the second CC and based on the activation command, at least a subset of TCI states in the first TCI pool, where the second CC uses a second mode that is different from the first mode.

In another aspect, a method for wireless communication is provided that includes transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, an activation command to activate a subset of TCI states in at least one of a first TCI pool or a second TCI pool for at least one of the first TRP or the second TRP for using a first mode on the reference CC, and activating, for the second CC and based on the activation command, at least a subset of TCI states in the first TCI pool, where the second CC uses a second mode that is different from the first mode.

In another aspect, a method for wireless communication is provided that includes receiving a reference CC configuration for a reference CC based on a first set of TRPs including one or more of a first TRP or a second TRP, receiving a second CC configuration for a second CC based on a second set of TRPs including one or more of the first TRP or the second TRP, receiving, for the reference CC, DCI indicating one of a subset of TCI states in a first TCI pool or a second TCI pool to use for at least one of the first TRP or the second TRP for using a first mode on the reference CC, and using, for the second CC and based on the DCI, the one of the subset of TCI states in the first TCI pool, where the second CC uses a second mode that is different from the first mode.

In another aspect, a method for wireless communication is provided that includes transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, DCI indicating one of a subset of TCI states in a first TCI pool or a second TCI pool to use for the first TRP or the second TRP for using a first mode on the reference CC, and using, for the second CC and based on the DCI, the one of the subset of TCI states in the first TCI pool, where the second CC uses a second mode that is different from the first mode.

In yet another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive a reference CC configuration for a reference CC based on a first set of TRPs including one or more of a first TRP or a second TRP, receive a second CC configuration for a second CC based on a second set of TRPs including one or more of the first TRP or the second TRP, receive, for the reference CC, a TCI pool configuration for using the reference CC in a first mode, wherein the TCI pool configuration includes one or more TCI pools for at least one of the first TRP or the second TRP, and configure, for the second CC, at least a subset of one of the one or more TCI pools, wherein the second CC uses a second mode that is different from the first mode, wherein the first mode and the second mode are each associated with a number of TCI pools.

In yet another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive a reference CC configuration for a reference CC based on a first set of TRPs including one or more of a first TRP or a second TRP, receive a second CC configuration for a second CC based on a second set of TRPs including one or more of the first TRP or the second TRP, receive, for the reference CC, an activation command to activate a subset of TCI states in at least one of a first TCI pool or a second TCI pool for at least one of the first TRP or the second TRP for using a first mode on the reference CC, and activate, for the second CC and based on the activation command, at least a subset of TCI states in the first TCI pool, wherein the second CC uses a second mode that is different from the first mode.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit a reference CC configuration for a reference CC based on a first set of TRPs including one or more of a first TRP or a second TRP, transmit a second CC configuration for a second CC based on a second set of TRPs including one or more of the first TRP or the second TRP, transmit, for the reference CC, a TCI pool configuration for using the reference CC in a first mode, wherein the TCI pool configuration includes one or more TCI pools for at least one of the first TRP or the second TRP, and configure, for the second CC, at least a subset of one of the one or more TCI pools, wherein the second CC uses a second mode that is different from the first mode, wherein the first mode and the second mode are each associated with a number of TCI pools.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit a reference CC configuration for a reference CC based on a first set of TRPs including one or more of a first TRP or a second TRP, transmit a second CC configuration for a second CC based on a second set of TRPs including one or more of the first TRP or the second TRP, transmit, for the reference CC, an activation command to activate a subset of TCI states in at least one of a first TCI pool or a second TCI pool for at least one of the first TRP or the second TRP for using a first mode on the reference CC, and activate, for the second CC and based on the activation command, at least a subset of TCI states in the first TCI pool, wherein the second CC uses a second mode that is different from the first mode.

In other aspects, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
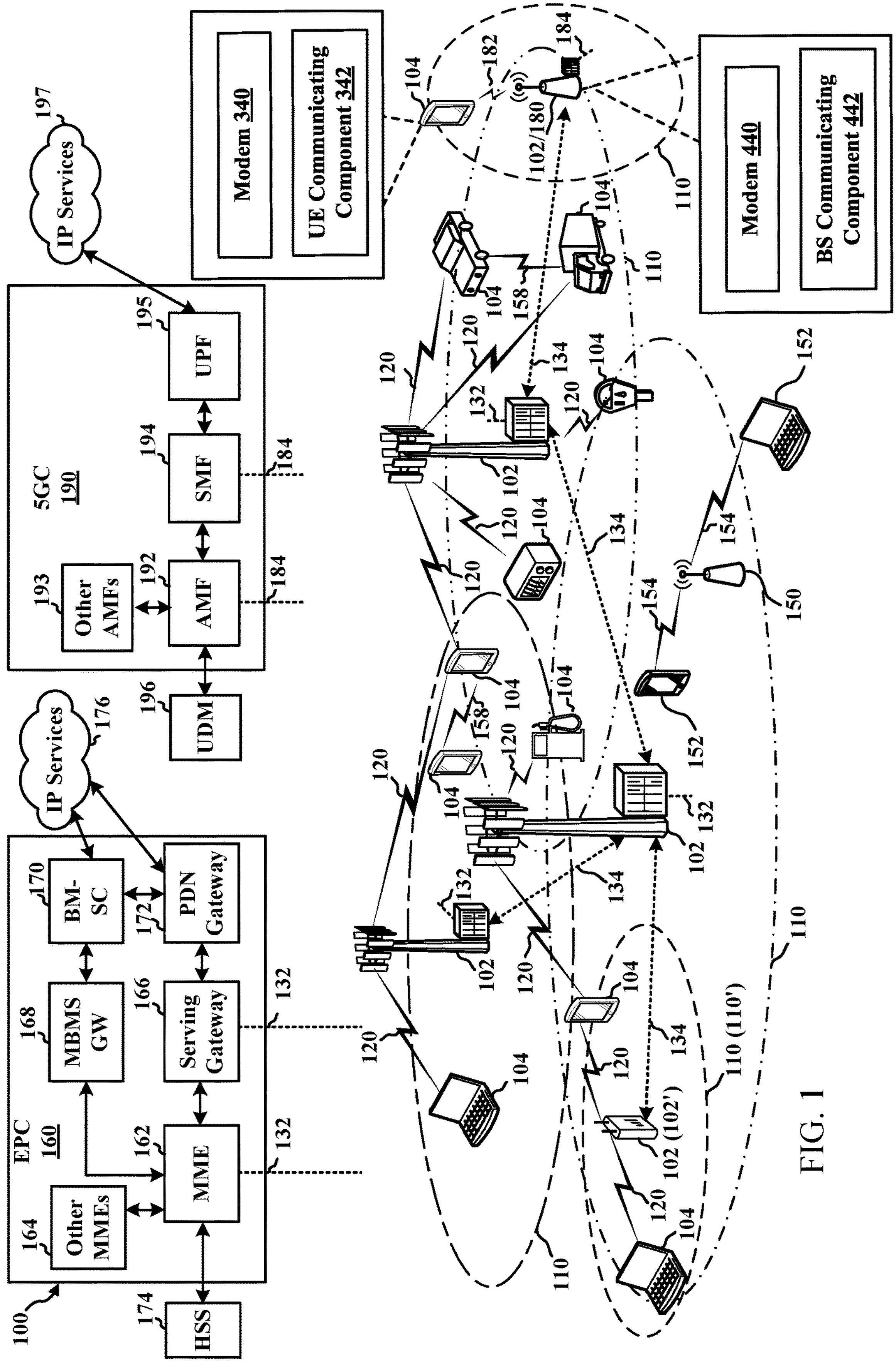
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring, activating, or indicating transmission configuration indicator (TCI) states for multiple configured component carriers (CCs) where the CCs may operate in different modes that may use a different number of TCI pools. In some wireless communication technologies, such as fifth generation (5G) new radio (NR), TCI states can be configured for a CC, which can include a network node transmitting a radio resource control (RRC) configuration of a TCI pool including indications of multiple TCI states to a user equipment (UE). For example, the TCI states can correspond to quasi-colocation (QCL) parameters or a beam to use for communications over a CC. The network node can also activate a subset of the multiple TCI states using a media access control (MAC) control element (CE), which may indicate indices of the RRC configured TCI states that are to be activated. The network node can also indicate, in downlink control information (DCI) one of the activated TCI states to be used for a given resource grant related to the CC.

In 5G NR, for example, when a bandwidth part (BWP) or CC is not configured with a TCI pool, the UE and/or network node can use a TCI pool configuration of a reference BWP or CC for the BWP or CC that is not configured. In addition, in 5G NR, a MAC-CE activation of a subset of TCI states in a configured TCI pool for a first CC can apply to all CCs on the same configured list as the first CC (and similarly, the DCI indication for unified TCI state can be applied to all CCs on the same configured list as the first CC). Also, in 5G NR, unified TCI state framework can be extended to multiple transmission/reception point (mTRP) cases. In an example, different modes for the CCs may be associated with different RRC configurations, MAC-CE formats, etc. For example, a mode can relate to using a certain number of TCI pools, TRPs, DCI indications, timing advance groups, etc. In this regard, for example, the different modes may relate to using different numbers of TCI pools, different numbers of TRPs, single DCI indication or multiple DCI indication, single timing advance group (sTAG) or multiple timing advance group (mTAG), etc.

For example, the different modes that a CC can use can include intra-cell single TRP (sTRP), inter-cell sTRP, intra-cell single DCI (sDCI), intra-cell multiple DCI (mDCI) sTAG, intra-cell mDCI mTAG, inter-cell mDCI sTAG, inter-cell mDCI mTAG, etc. For example, inter-cell can refer to having a RRC parameter or value AdditionalPCIlist configured in a servingCellConfig RRC information element (IE). In an example, for TCI for inter-cell beam management (BM), the TCI can be defined on a quasi-colocation (QCL) chain including a non-serving cell synchronization signal block (SSB). For example, when two TCI pools per TCI type are configured in a CC, each pool may correspond to a TRP or control resource set (CORESET) pool. When using MAC-CE to activate a TCI, the MAC-CE may indicate which TCI pool the TCI is from. For example, when TCI pool is associated with CORESET pool, the MAC-CE can indicate an identifier of the CORESET POOL, or additional bits per TCI can be used to indicate the TCI pool identifier in addition to the TCI type (e.g., uplink, downlink, or joint uplink and downlink). In any case, when CCs operate in different modes, there may be some issues for cross CC TCI configuration, activation, or indication, as identified herein. These issues can be handled using certain rules or functions in such cases to determine how to configure, activate, or indicate TCI states for the CCs given the different modes that are utilized by the CCs.

For example, it may be possible that for CCs using different modes, a single TCI pool per TCI type (e.g., uplink, downlink, or joint downlink and uplink) for multiple TRPs can be configured for all modes. In another example, it may be possible that at least for some modes (e.g., mDCI), two pools can be configured per TCI type for two TRPs, respectively. Issues may arise when a reference CC and an applied CC use different modes such that one CC uses a first number of TCI pools and the other CC uses a different number of TCI pools. In another example, it may be possible that a reference BWP or CC TCI pool is used to configure the TCI pool for another BWP or CC, and if so, issues may arise where the reference BWP or CC and the BWP or CC to be configured use different modes. In another example, it may be possible that TCI activation and/or indication is across CCs (e.g., across multiple CCs in a CC list), and if so, issues may arise where the CCs in the list use different modes.

Examples of such issues can include RRC configuration mismatch between reference BWP or CC and the target BWP or CC. For example, a first BWP (BWP1) can be reference BWP under sTRP operation with a single TCI pool, and a second BWP (BWP2) may not have its own TCI configuration, and under 5G NR, can follow BWP1's TCI configuration. A second BWP (BWP2) may be configured in a mTRP mode which may require 2 TCI pools in RRC, which can present an issue where the reference BWP only includes the single TCI pool. In another example, there can be MAC-CE format mismatch between target CC of the MAC-CE and the CC to apply the same update. For example, a first CC (CC1) and a second CC (CC2) can be on the same CC list (e.g., such that CC1 and CC2 share the same MAC-CE activation). CC1 can be in mDCI mTRP mode, and CC2 can be in sDCI mTRP mode. A TCI activation MAC-CE for CC1 may not directly work for CC2 in this example.

Aspects described herein relate to defining or using rules in one or more of the above examples to address possible issues between the TCI pool configuration, activation, or indication across CCs. This may facilitate compliance with a wireless communication technology specification, such as 5G NR, while achieving efficiencies associated with joint (or cross) CC configuration, activation, and/or indication, such as decreasing radio resource consumption for indicating TCI pools, subsets thereof, or TCI states, decreasing processing complexity for indicating or determining the configured TCI pools, activated subsets, or indicated TCI states for multiple CCs, etc.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for configuring, activating, or using one or more TCI pools for each of multiple CCs, in accordance with aspects described herein. In addition, some nodes may have a modem 440 and a BS communicating component 442 for configuring, activating, or indicating one or more TCI pools for a UE to use for each of multiple CCs, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an Si interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can transmit, and/or UE communicating component 342 can receive, for one or more of multiple CCs, one or more of a RRC configuration of TCI pools, a MAC-CE activation activating a subset of TCI states in the TCI pools, or a DCI indication indicating one of the subset of TCI state for one or more of the subsets of TCI states. BS communicating component 442 may configure, activate, or indicate the TCI states based on one or more rules, described herein, based on modes used by the CCs. In addition, UE communicating component 342 can apply the RRC configuration for one or more CCs, activate a subset of TCI states for one or more CCs, or use an indicated TCI state for one or more CCs based on the modes used by the CCs.

Figure 2:
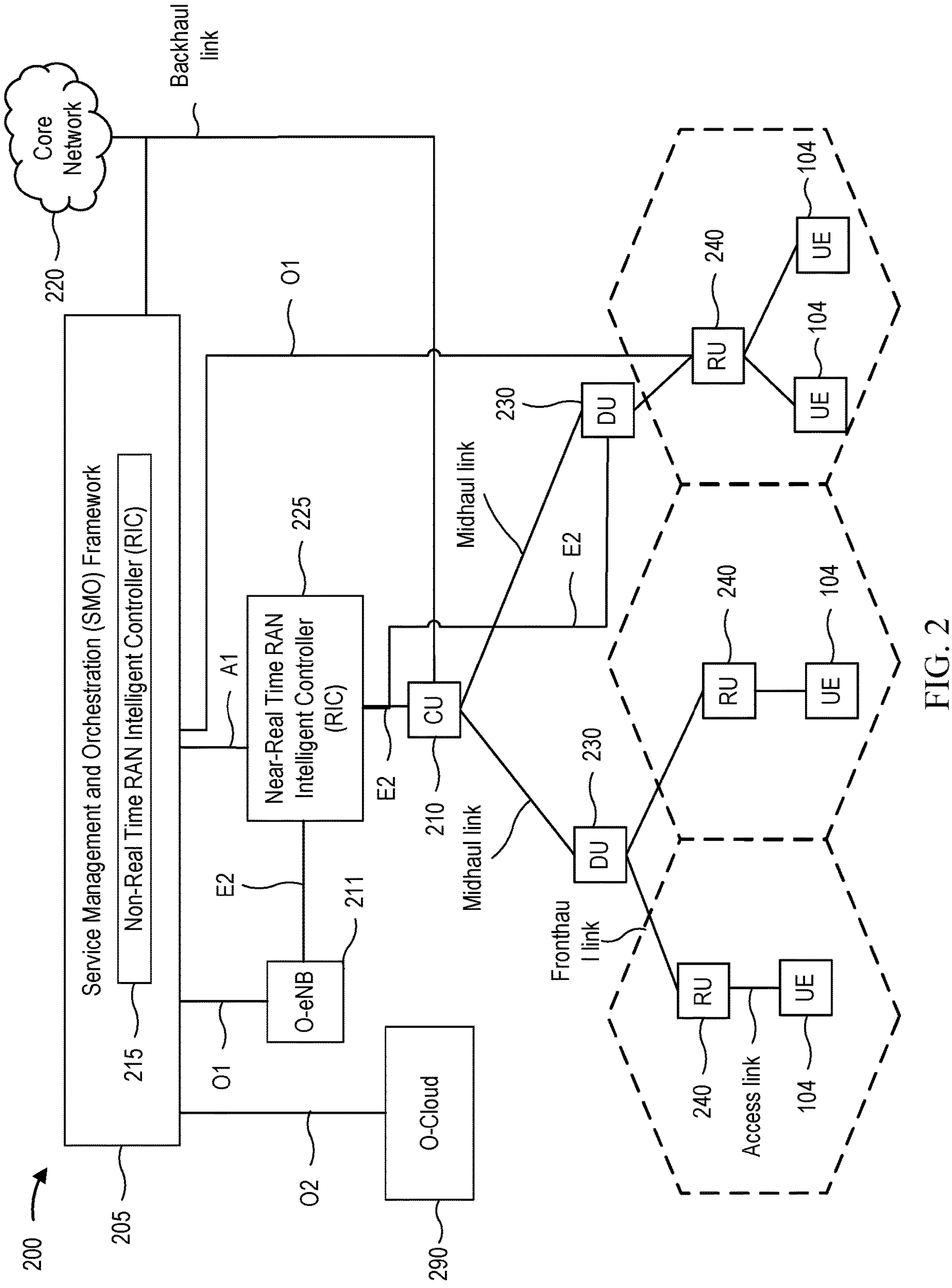
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within one or more DUs 230 to configure, activate, or indicate TCI states for a UE 104. In another example, BS communicating component 442, as described herein, can be at least partially implemented within one or more RUs 240 to configure, activate, or indicate TCI states for a UE 104.

Turning now to FIGS. 3-11, aspects are depicted with reference to one or more components and one or more methods that may perform the actions or operations described herein, where aspects in dashed line may be optional. Although the operations described below in FIGS. 5-10 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
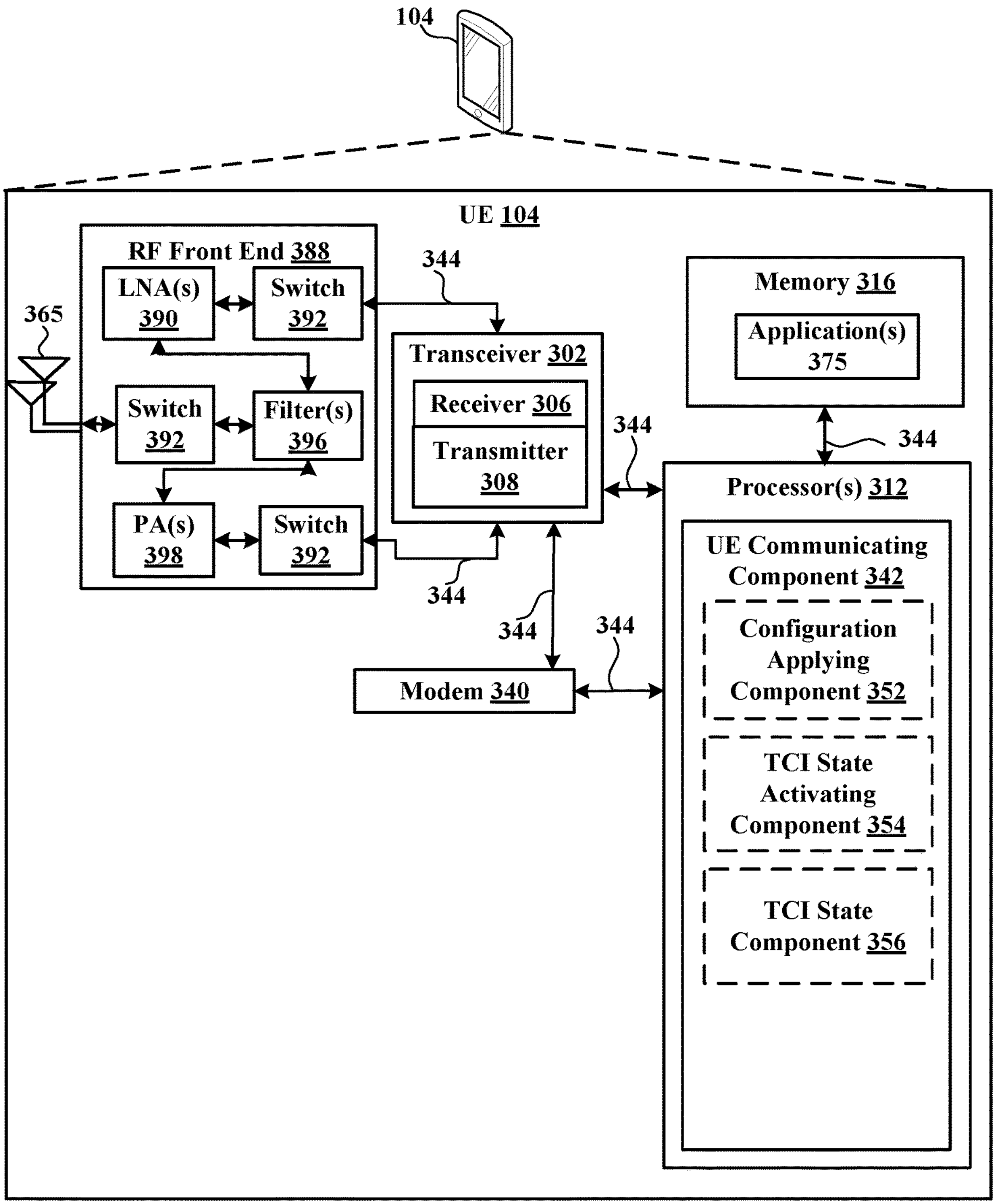
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for configuring, activating, or using one or more TCI pools for each of multiple CCs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a configuration applying component 352 for applying a configuration at the UE 104, such as a CC configuration, a TCI pool configuration, etc., a TCI state activating component 354 for activating a subset of TCI states in a TCI pool, and/or a TCI state component 356 for using one of the subset of TCI states for one or more TCI pools, in accordance with aspects described herein.

In an aspect, the processor(s) 312 may correspond to one or more of the processors described in connection with the UE in FIG. 11. Similarly, the memory 316 may correspond to the memory described in connection with the UE in FIG. 11.

Figure 4:
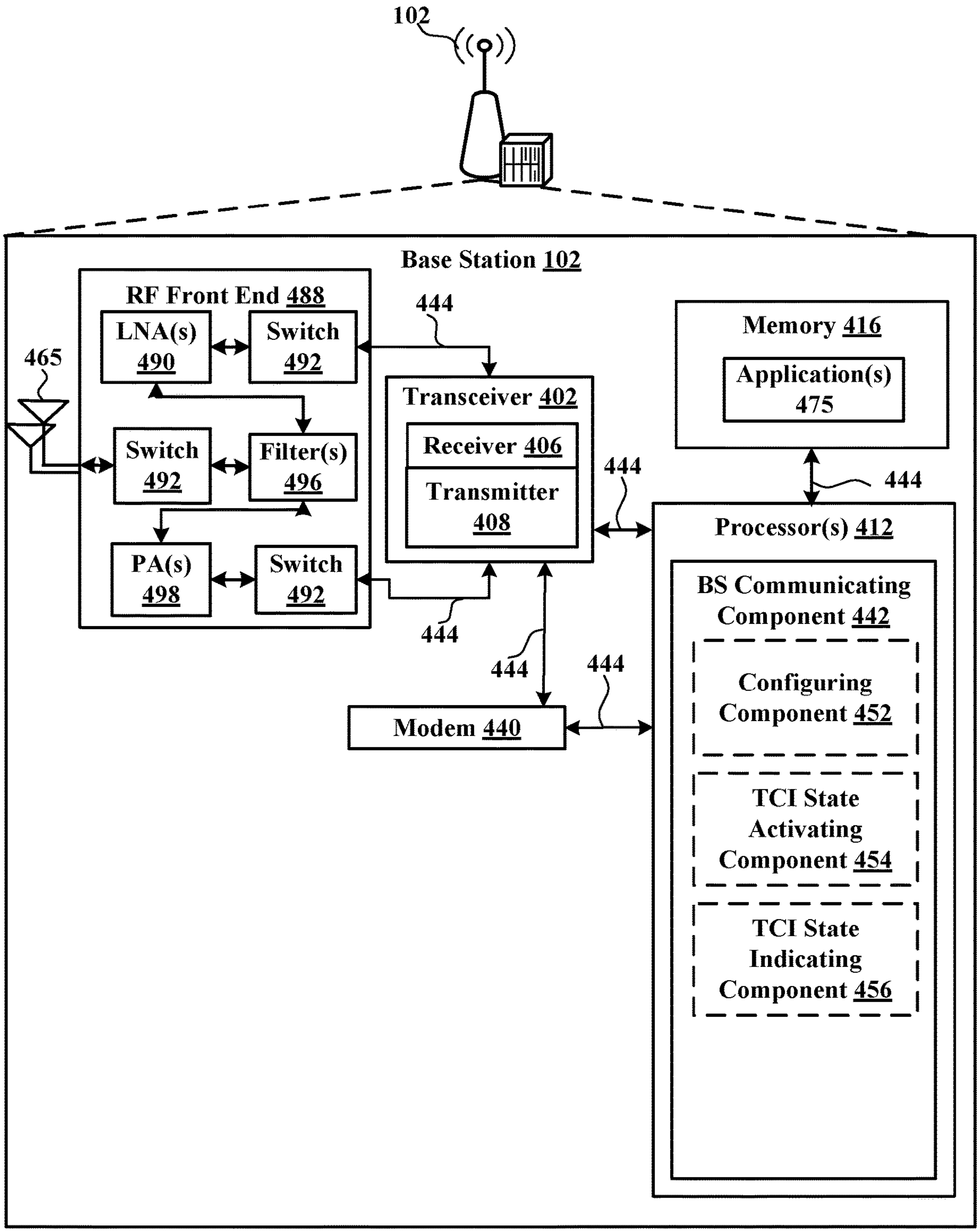
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and a BS communicating component 442 for configuring, activating, or indicating one or more TCI pools for a UE to use for each of multiple CCs, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a configuring component 452 for configuring a UE 104 with one or more configurations, such as a CC configuration, a TCI pool configuration, etc., a TCI state activating component 454 for activating a subset of TCI states in a TCI pool, and/or a TCI state indicating component 456 for indicating one of the subset of TCI states for one or more TCI pools, in accordance with aspects described herein.

In an aspect, the processor(s) 412 may correspond to one or more of the processors described in connection with the base station in FIG. 11. Similarly, the memory 416 may correspond to the memory described in connection with the base station in FIG. 11.

Figure 5:
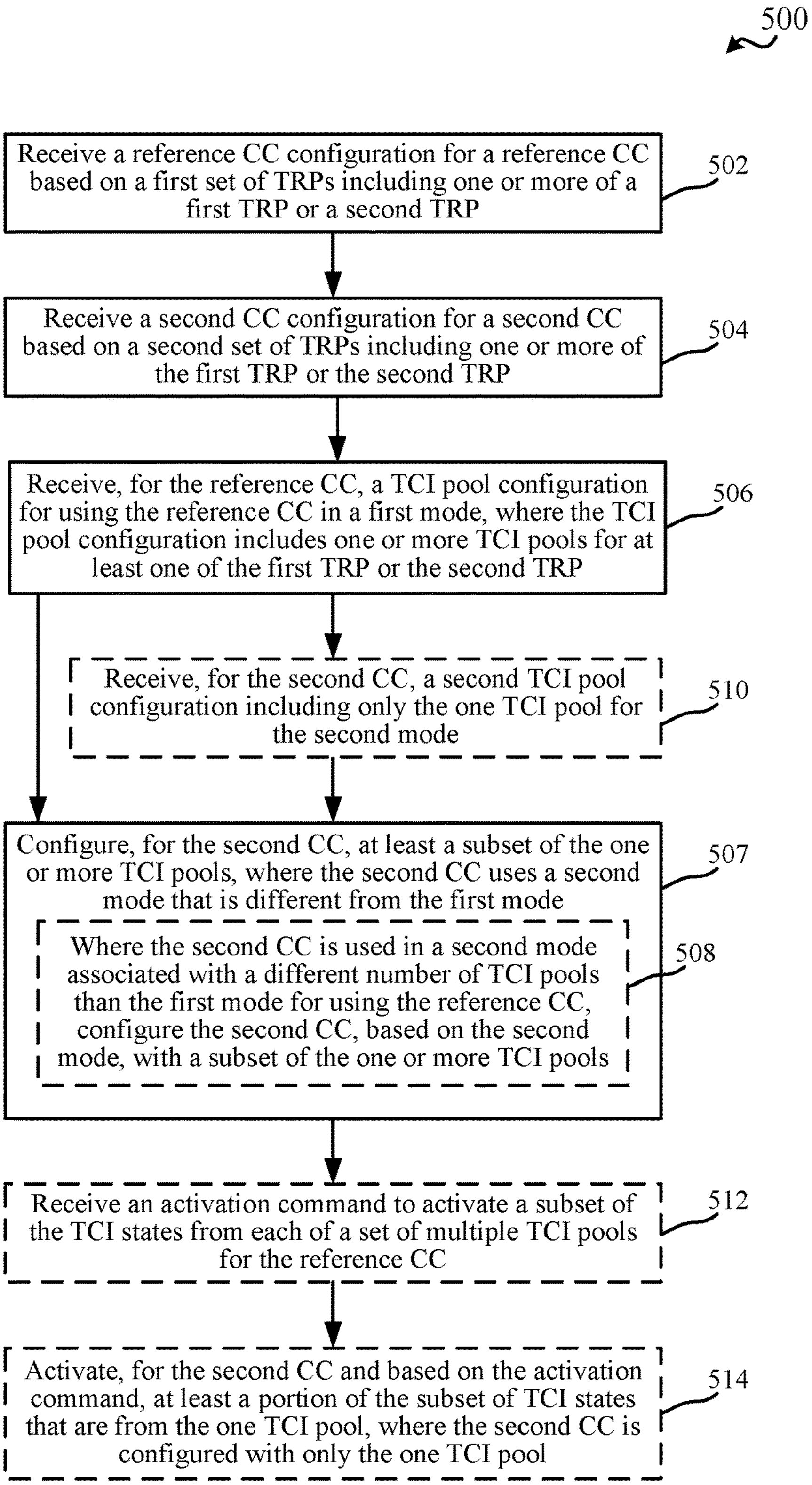
FIG. 5 is a flow chart illustrating an example of a method for receiving configurations for multiple component carriers (CCs) where at least two CCs have a different number of transmission configuration indicator (TCI) pools, in accordance with aspects described herein.
Figure 6:
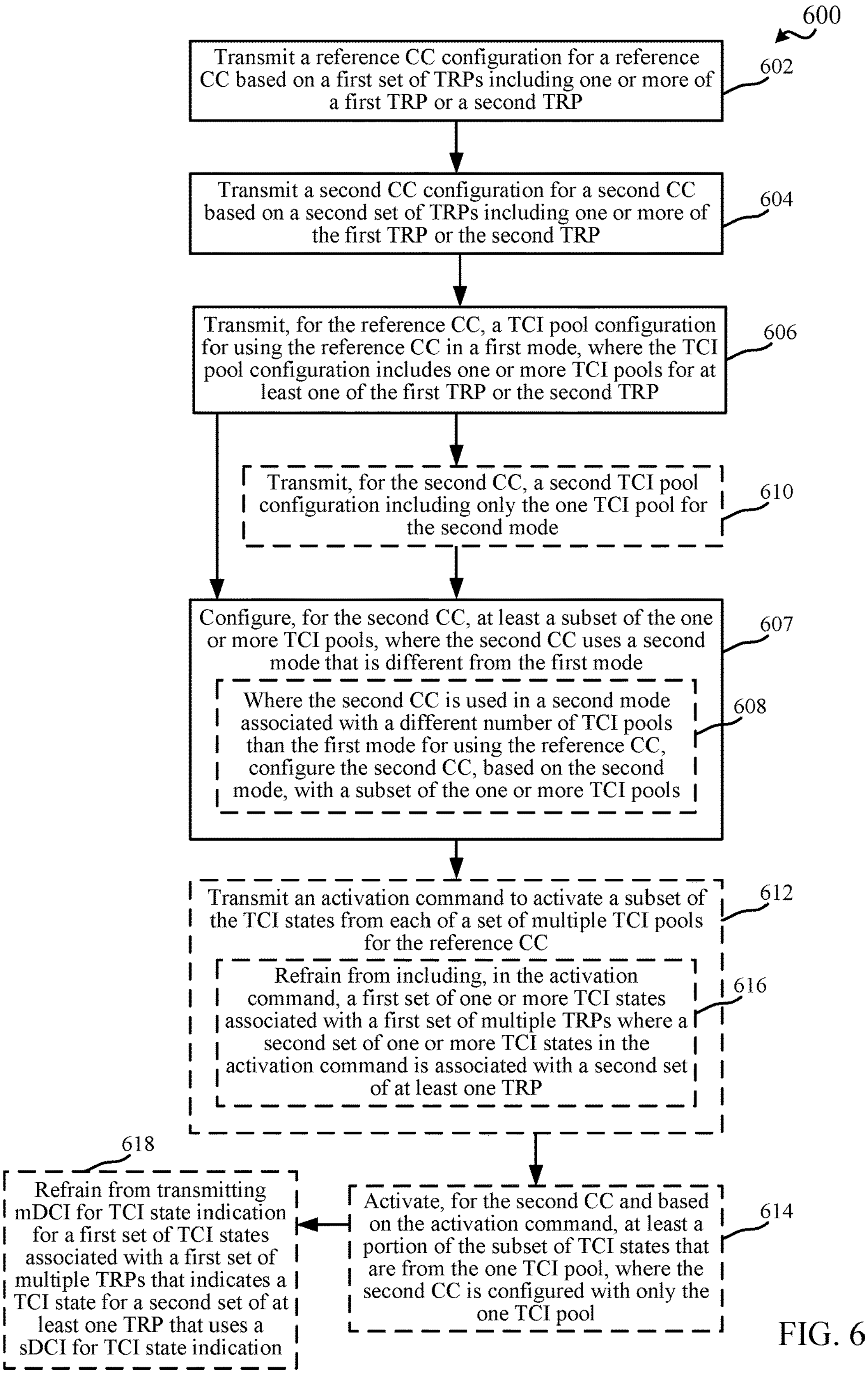
FIG. 6 is a flow chart illustrating an example of a method for transmitting configurations for multiple CCs where at least two CCs have a different number of TCI pools, in accordance with aspects described herein.

FIG. 5 illustrates a flow chart of an example of a method 500 for receiving configurations for multiple CCs where at least two CCs have a different number of TCI pools, in accordance with aspects described herein. FIG. 6 illustrates a flow chart of an example of a method 600 for transmitting configurations for multiple CCs where at least two CCs have a different number of TCI pools, in accordance with aspects described herein. In an example, a UE 104 can perform the functions described in method 500 using one or more of the components described in FIGS. 1 and 3. In an example, a network node, such as a base station 102, a gNB, a monolithic base station or gNB, a portion of a disaggregated base station or gNB, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, a reference CC configuration for a reference CC based on a first set of TRPs including one or more of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the reference CC configuration for the reference CC based on the first set of TRPs including one or more of a first TRP or a second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be transmitted using RRC signaling.

In method 500, at Block 502, a reference CC configuration for a reference CC based on a first set of TRPs including one or more of a first TRP or a second TRP can be received. In an aspect, configuration applying component 352, e.g., in conjunction with processor(s) 312, memory 316, transceiver 302, UE communicating component 342, etc., can receive (e.g., from a base station 102) the reference CC configuration for the reference CC based on the first set of TRPs including one or more of a first TRP or a second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be received over RRC signaling.

In method 600, at Block 604, a second CC configuration for a second CC based on a second set of TRPs including one or more of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the second CC configuration for the second CC based on the first set of TRPs including one or more of a first TRP or a second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be transmitted using RRC signaling.

In method 500, at Block 504, a second CC configuration for a second CC based on a first set of TRPs including one or more of a first TRP or a second TRP can be received. In an aspect, configuration applying component 352, e.g., in conjunction with processor(s) 312, memory 316, transceiver 302, UE communicating component 342, etc., can receive (e.g., from a base station 102) the second CC configuration for the second CC based on the first set of TRPs including one or more of a first TRP or a second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be received over RRC signaling.

For example, the reference CC and the second CC can be configured over different frequency bands or subbands. As described above, the reference CC and the second CC may be configured in different modes, which can relate to different TCI pool configurations. For example, the reference CC and second CC may each be configured with a mode that may include intra-cell sTRP, inter-cell sTRP, intra-cell sDCI, intra-cell mDCI sTAG, intra-cell mDCI mTAG, inter-cell mDCI sTAG, inter-cell mDCI mTAG, etc. In this regard, for example, one CC may be mTRP while the other CC is sTRP, or one CC may use sDCI while the other CC uses mDCI, or one CC may use sTAG while the other CC uses mTAG, etc. This can present some potential issues for RRC configuration of TCI pools, as described herein.

In method 600, at Block 606, a TCI pool configuration for using the reference CC in a first mode can be transmitted, where the TCI pool configuration includes one or more TCI pools for at least one of the first TRP or the second TRP. In an aspect, configuring component 452, e.g., in conjunction with processor(s) 412, memory 416, transceiver 402, BS communicating component 442, etc., can transmit (e.g., to a UE 104) the TCI pool configuration for using the reference CC in the first mode, where the TCI pool configuration includes one or more TCI pools for at least one of the first TRP or the second TRP. For example, where the reference CC uses a first mode that includes multiple TRPs, mDCI, mTAG, etc., the TCI pool configuration may include multiple TCI pools (e.g., a TCI pool for each TRP, a TCI pool for each DCI, a TCI pool for each TAG, etc.). For example, the TCI pool configuration can be transmitting using RRC signaling.

In method 500, at Block 506, a TCI pool configuration for using the reference CC in a first mode can be received, where the TCI pool configuration includes one or more TCI pools for at least one of the first TRP or the second TRP. In an aspect, configuration applying component 352, e.g., in conjunction with processor(s) 312, memory 316, transceiver 302, UE communicating component 342, etc., can receive (e.g., from a base station 102) the TCI pool configuration for using the reference CC in the first mode, where the TCI pool configuration includes one or more TCI pools for at least one of the first TRP or the second TRP. For example, the TCI pool configuration can be received over RRC signaling.

As described, in some examples, the second CC may use a second mode that is different than the first mode used by the reference CC. For example, the second mode may correspond to a different number of TCI pools to be configured for the second CC. In method 600, at Block 607, at least a subset of the one or more TCI pools can be configured for the second CC, where the second CC uses a second mode that is different from the first mode. In an aspect, configuring component 452, e.g., in conjunction with processor(s) 412, memory 416, transceiver 402, BS communicating component 442, etc., can configure, for the second CC, at least a subset of the one or more TCI pools, where the second CC uses a second mode that is different from the first mode. For example, the first mode and second mode can each be associated with a number of TCI pools (e.g., a different number of TCI pools). In one example, in configuring at least the subset of the one or more TCI pools at Block 607, optionally at Block 608, where the second CC is used in a second mode associated with a different number of TCI pools than the first mode for using the reference CC, the second CC can be configured, based on the second mode, with a subset of the one or more TCI pools. In an aspect, configuring component 452, e.g., in conjunction with processor(s) 412, memory 416, transceiver 402, BS communicating component 442, etc., can, where the second CC is used in a second mode associated with a different number of TCI pools than the first mode for using the reference CC, configure the second CC, based on the second mode, with a subset of the one or more TCI pools. This can be based on applying at least a portion of the TCI pool configuration for the reference CC, or applying a second TCI pool configuration transmitted for the second CC, as described further herein.

In method 500, at Block 507, at least a subset of the one or more TCI pools can be configured for the second CC, where the second CC uses a second mode that is different from the first mode. In an aspect, configuration applying component 352, e.g., in conjunction with processor(s) 312, memory 316, transceiver 302, UE communicating component 342, etc., can configure, for the second CC, at least a subset of the one or more TCI pools, where the second CC uses a second mode that is different from the first mode. For example, the first mode and second mode can each be associated with a number of TCI pools (e.g., a different number of TCI pools). In one example, in configuring at least the subset of the one or more TCI pools at Block 507, optionally at Block 508, where the second CC is used in a second mode associated with a different number of TCI pools than the first mode for using the reference CC, the second CC can be configured, based on the second mode, with a subset of the one or more TCI pools. In an aspect, configuration applying component 352, e.g., in conjunction with processor(s) 312, memory 316, transceiver 302, UE communicating component 342, etc., can, where the second CC is used in a second mode associated with a different number of TCI pools than the first mode for using the reference CC, configure the second CC, based on the second mode, with a subset of the one or more TCI pools. This can be based on applying at least a portion of the TCI pool configuration for the reference CC, or applying a second TCI pool configuration received for the second CC, as described further herein.

For example, for the same TCI type, some mode for one CC (e.g. mDCI) may have TCI pool per TRP, some mode for another CC (e.g. sTRP) may have a single TCI pool. There may be a possible issue where the number of TCI pools may mismatch between reference CC and the second (or target) CC. Where the reference CC is configured in the first mode with multiple (e.g., two) TCI pools per TCI type, e.g. one pool per TRP, while the target CC is configured in the second mode with a single TCI pool, a defined TCI pool can be configured for the second CC, which may include a first TCI pool from the TCI pool configuration for the reference CC. Even if there is no mismatch in terms of the number of TCI pools between reference CC and target CC, other issues may be possible. For example, where reference CC is intra-cell only, which cannot be used to configure a target CC for inter-cell BM, and reference CC is sTAG only, association between TAG and TCI can be made by MAC-CE, e.g. 1-to-1 mapping between CORESET pool and TAG ID, or association between TAG and TCI can be defined in RRC configuration (but reference CC may not have mTAG configuration in RRC), as described further herein.

In one example, the RRC configuration of TCI pools can be per CC. For example, in method 600, optionally at Block 610, a second TCI pool for the second CC configuration including only the one TCI pool for the second mode can be transmitted. In an aspect, configuring component 452, e.g., in conjunction with processor(s) 412, memory 416, transceiver 402, BS communicating component 442, etc., can transmit (e.g., to the UE 104), for the second CC, the second TCI pool configuration including only the one TCI pool for the second mode. For example, the TCI pool configuration can be transmitted using RRC signaling. For example, in method 500, optionally at Block 510, a second TCI pool for the second CC configuration including only the one TCI pool for the second mode can be received. In an aspect, configuration applying component 352, e.g., in conjunction with processor(s) 312, memory 316, transceiver 302, UE communicating component 342, etc., can receive (e.g., from the base station 102), for the second CC, the second TCI pool configuration including only the one TCI pool for the second mode. For example, the TCI pool configuration can be received over RRC signaling. As the TCI pool configurations are received for the CCs, there may be no issue with configuration though the number of TCI pools for the CCs can be different. There may, however, be potential issues with cross CC activation of subsets of TCI pools.

For example, where the reference CC is configured with two TCI pools and the second CC to apply the same activation has one TCI pool, only the activation from first TCI pool may be applied in the second CC to apply the same TCI activation. In an example, in method 600, optionally at Block 612, an activation command to activate a subset of the TCI states from each of a set of multiple TCI pools for the reference CC can be transmitted. In an aspect, TCI state activating component 454, e.g., in conjunction with processor(s) 412, memory 416, transceiver 402, BS communicating component 442, etc., can transmit (e.g., to the UE 104) an activation command to activate a subset of the TCI states from each of a set of multiple TCI pools for the reference CC. For example, the activation command can be transmitted in a MAC-CE. In method 600, optionally at Block 614, at least a portion of the subset of TCI states that are from the one TCI pool can be activated, for the second CC and based on the activation command, where the second CC is configured with only the one TCI pool. In an aspect, TCI state activating component 454, e.g., in conjunction with processor(s) 412, memory 416, transceiver 402, BS communicating component 442, etc., can activate, for the second CC and based on the activation command, at least the portion of the subset of TCI states that are from the one TCI pool, where the second CC is configured with only the one TCI pool. For example, as described, activation from the first TCI pool of the reference CC can be applied for the one TCI pool of the second CC.

In this example, in method 500, optionally at Block 512, an activation command to activate a subset of the TCI states from each of a set of multiple TCI pools for the reference CC can be received. In an aspect, TCI state activating component 354, e.g., in conjunction with processor(s) 312, memory 316, transceiver 302, UE communicating component 342, etc., can receive (e.g., from the base station 102) an activation command to activate a subset of the TCI states from each of a set of multiple TCI pools for the reference CC. For example, the activation command can be received in a MAC-CE. In method 500, optionally at Block 514, at least a portion of the subset of TCI states that are from the one TCI pool can be activated, for the second CC and based on the activation command, where the second CC is configured with only the one TCI pool. In an aspect, TCI state activating component 354, e.g., in conjunction with processor(s) 312, memory 316, transceiver 302, UE communicating component 342, etc., can activate, for the second CC and based on the activation command, at least the portion of the subset of TCI states that are from the one TCI pool, where the second CC is configured with only the one TCI pool. For example, as described, activation from the first TCI pool of the reference CC can be applied for the one TCI pool of the second CC.

In some examples, there can be some rules defined (e.g., in the wireless communication technology, such as 5G NR) for the reference CC and the second CC of MAC-CE and DCI. For example, if at least one CC is configured for inter-cell BM, the reference CC or BWP can be configured for inter-cell BM (e.g., in the reference CC configuration). In another example, if at least one CC is configured for mTAG, and association between TAG and TCI is defined in RRC, then mTAG can defined in reference CC or BWP (e.g., in the reference CC configuration). Alternatively, reference CC or BWP may be pre-configured with multiple TCI configurations for multiple modes, while reference CC itself may only apply one of the TCI configuration.

In other examples, exclusion rules can exist (e.g., in the wireless communication technology standard, such as 5G NR, and may be implemented in the network node and/or UE 104) for certain cases, and configuring component 452 and/or activating component 454 can refrain from certain configurations or activations based on the exclusion rules. For example, based on a wireless communication technology standard, such as 5G NR, a UE may not expect certain combinations/sub-use cases, such as target CC of indication is sDCI, the CC on the same list is mDCI. In this case, the base station 102 may not configure sDCI and mDCI CC on the same list for TCI activation/indication. For example, in transmitting the activation command at Block 612, optionally at Block 616, the base station 102 can refrain from including, in the activation command, a first set of one or more TCI states associated with a first set of multiple TRPs where a second set of one or more TCI states in the activation command is associated with a second set of at least one TRP. In an aspect, TCI state activating component 454, e.g., in conjunction with processor(s) 412, memory 416, transceiver 402, BS communicating component 442, etc., can refrain from including, in the activation command, a first set of one or more TCI states associated with a first set of multiple TRPs where a second set of one or more TCI states in the activation command is associated with a second set of at least one TRP.

In another example, the exclusion rules can include allowing certain sub-use cases, but not triggering TCI update. For example, a mDCI may not apply the TCI activation/indication from a sDCI CC on the same CC list. For example, in method 600, optionally at Block 618, the base station 102 can refrain from transmitting mDCI for TCI state indication for a first set of TCI states associated with a first set of multiple TRPs that indicates a TCI state for a second set of at least one TRP that uses a sDCI for TCI state indication. In an aspect, TCI state activating component 454, e.g., in conjunction with processor(s) 412, memory 416, transceiver 402, BS communicating component 442, etc., can refrain from transmitting mDCI for TCI state indication for a first set of TCI states associated with a first set of multiple TRPs that indicates a TCI state for a second set of at least one TRP that uses a sDCI for TCI state indication.

In another example, a mode change in the CC can be triggered by the TCI MAC-CE to avoid mismatch of modes. As such, for example, the activation command transmitted at Block 612, and/or received at Block 512, can indicate the mode change for at least one CC so that the number of TCI pools for the CCs match (though the modes for the CCs may be the same or different). Where a mode change is received in the activation command, configuration applying component 352 can change the mode for the associated CC before activating the subset of TCI states indicated in the activation command.

Figure 7:
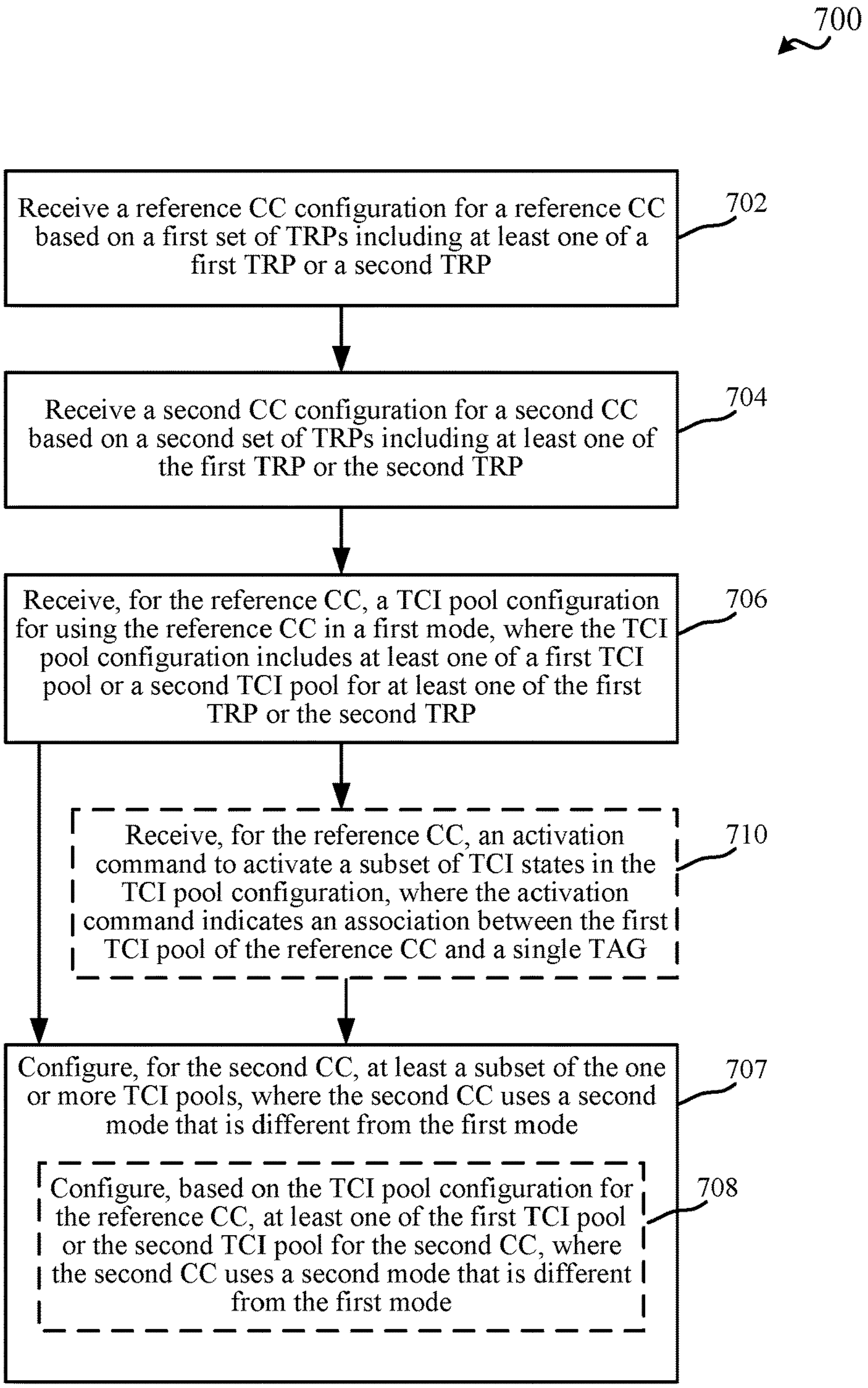
FIG. 7 is a flow chart illustrating an example of a method for receiving configurations for multiple CCs using different modes where a TCI pool configuration for one CC is used to configure TCI pools for another CC, in accordance with aspects described herein.
Figure 8:
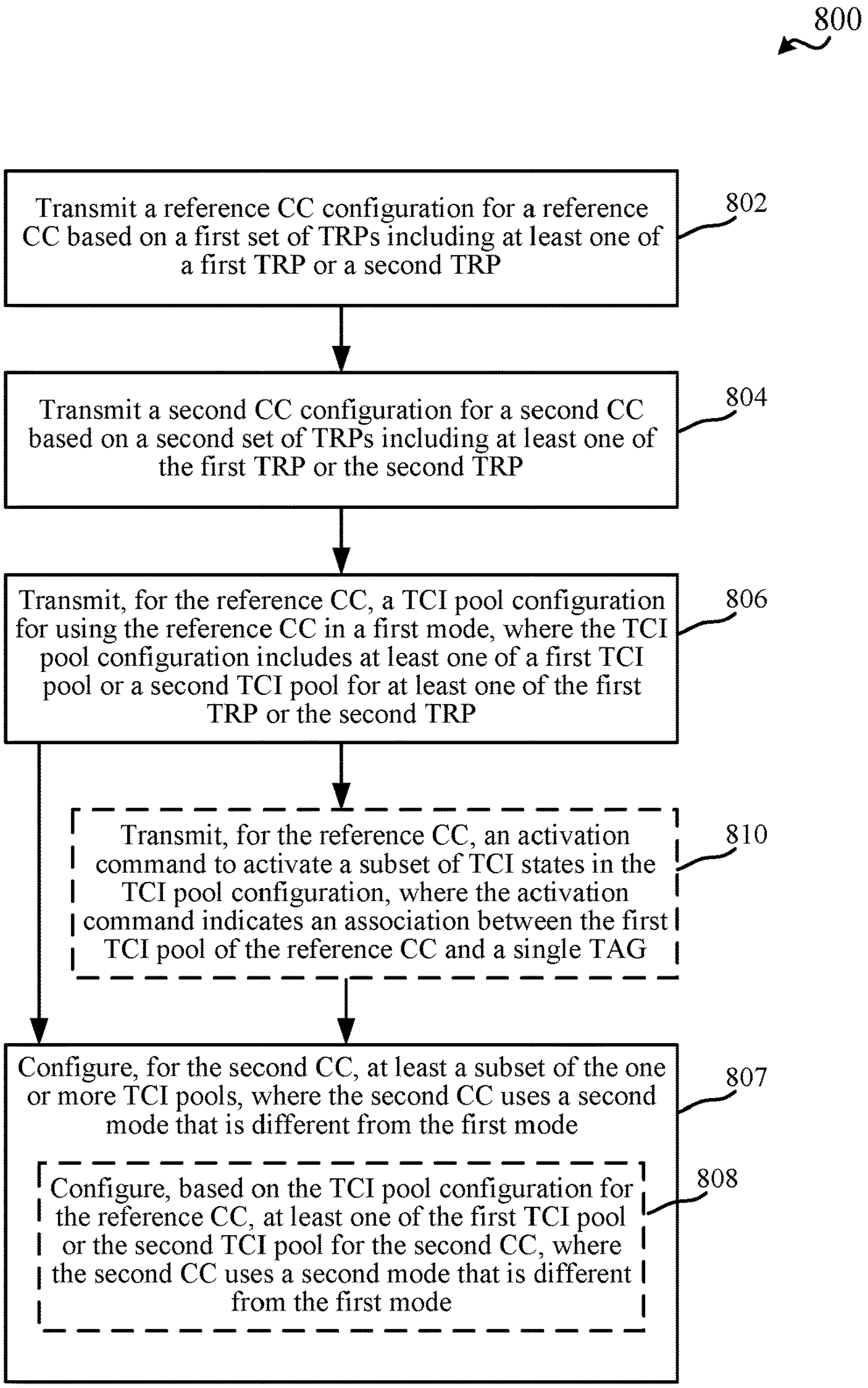
FIG. 8 is a flow chart illustrating an example of a method for transmitting configurations for multiple CCs using different modes where a TCI pool configuration for one CC is used to configure TCI pools for another CC, in accordance with aspects described herein.

FIG. 7 illustrates a flow chart of an example of a method 700 for receiving configurations for multiple CCs using different modes where a TCI pool configuration for one CC is used to configure TCI pools for another CC, in accordance with aspects described herein. FIG. 8 illustrates a flow chart of an example of a method 800 for transmitting configurations for multiple CCs using different modes where a TCI pool configuration for one CC is used to configure TCI pools for another CC, in accordance with aspects described herein. In an example, a UE 104 can perform the functions described in method 700 using one or more of the components described in FIGS. 1 and 3. In an example, a network node, such as a base station 102, a gNB, a monolithic base station or gNB, a portion of a disaggregated base station or gNB, etc.) can perform the functions described in method 800 using one or more of the components described in FIGS. 1 and 4. Methods 700 and 800 are described in conjunction with one another for ease of explanation; however, the methods 700 and 800 are not required to be performed together and indeed can be performed independently using separate devices.

In method 800, at Block 802, a reference CC configuration for a reference CC based on a first set of TRPs including at least one of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the reference CC configuration for the reference CC based on the first set of TRPs including at least one of the first TRP or the second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be transmitted using RRC signaling.

In method 700, at Block 702, a reference CC configuration for a reference CC based on a first set of TRPs including at least one of a first TRP or a second TRP can be received. In an aspect, configuration applying component 352, e.g., in conjunction with processor(s) 312, memory 316, transceiver 302, UE communicating component 342, etc., can receive (e.g., from a base station 102) the reference CC configuration for the reference CC based on the first set of TRPs including at least one of the first TRP or the second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be received over RRC signaling.

In method 800, at Block 804, a second CC configuration for a second CC based on a second set of TRPs including at least one of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the second CC configuration for the second CC based on the first set of TRPs including at least one of the first TRP or the second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be transmitted using RRC signaling.

In method 700, at Block 704, a second CC configuration for a second CC based on a first set of TRPs including at least one of a first TRP or a second TRP can be received. In an aspect, configuration applying component 352, e.g., in conjunction with processor(s) 312, memory 316, transceiver 302, UE communicating component 342, etc., can receive (e.g., from a base station 102) the second CC configuration for the second CC based on the first set of TRPs including at least one of the first TRP or the second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be received over RRC signaling.

For example, the reference CC and the second CC can be configured over different frequency bands or subbands. As described above, the reference CC and the second CC may be configured in different modes, which can relate to different TCI pool configurations. For example, the reference CC and second CC may each be configured with a mode that may include intra-cell sTRP, inter-cell sTRP, intra-cell sDCI, intra-cell mDCI sTAG, intra-cell mDCI mTAG, inter-cell mDCI sTAG, inter-cell mDCI mTAG, etc. In this regard, for example, one CC may be mTRP while the other CC is sTRP, or one CC may use sDCI while the other CC uses mDCI, or one CC may use sTAG while the other CC uses mTAG, etc. This can present some potential issues for RRC configuration of TCI pools where the TCI pool for the reference CC is to be used to also configure the second CC, as described herein.

In method 800, at Block 806, a TCI pool configuration for using the reference CC in a first mode can be transmitted, where the TCI pool configuration includes at least one of a first TCI pool or a second TCI pool for at least one of the first TRP or the second TRP. In an aspect, configuring component 452, e.g., in conjunction with processor(s) 412, memory 416, transceiver 402, BS communicating component 442, etc., can transmit (e.g., to a UE 104) the TCI pool configuration for using the reference CC in the first mode, where the TCI pool configuration includes at least one of a first TCI pool or a second TCI pool for at least one of the first TRP or the second TRP. For example, where the reference CC uses a first mode that includes multiple TRPs, mDCI, mTAG, etc. the TCI pool configuration may include multiple TCI pools (e.g., a TCI pool for each TRP, a TCI pool for each DCI, a TCI pool for each TAG, etc.). For example, the TCI pool configuration can be transmitting using RRC signaling.

In method 700, at Block 706, a TCI pool configuration for using the reference CC in a first mode can be received, where the TCI pool configuration includes at least one of a first TCI pool or a second TCI pool for at least one of the first TRP or the second TRP. In an aspect, configuration applying component 352, e.g., in conjunction with processor(s) 312, memory 316, transceiver 302, UE communicating component 342, etc., can receive (e.g., from a base station 102) the TCI pool configuration for using the reference CC in the first mode, where the TCI pool configuration includes at least one of a first TCI pool or a second TCI pool for at least one of the first TRP or the second TRP. For example, the TCI pool configuration can be received over RRC signaling.

As described, in some examples, the second CC may use a second mode that is different than the first mode used by the reference CC. For example, the second mode may correspond to a different number of TCI pools to be configured for the second CC. In method 800, at Block 807, at least a subset of the one or more TCI pools (e.g., the first TCI pool or the second TCI pool) can be configured for the second CC, where the second CC uses a second mode that is different from the first mode. In an aspect, configuring component 452, e.g., in conjunction with processor(s) 412, memory 416, transceiver 402, BS communicating component 442, etc., can configure, for the second CC, at least a subset of the one or more TCI pools, where the second CC uses a second mode that is different from the first mode. For example, the first mode and second mode can each be associated with a number of TCI pools (e.g., a different number of TCI pools). In one example, in configuring at least the subset of the one or more TCI pools at Block 807, optionally at Block 808, at least one of the first TCI pool or a second TCI pool can be configured for the second CC based on the TCI pool configuration for the reference CC, where the second CC uses a second mode that is different from the first mode. In an aspect, configuring component 452, e.g., in conjunction with processor(s) 412, memory 416, transceiver 402, BS communicating component 442, etc., can configure, based on the TCI pool configuration for the reference CC, at least one of the first TCI pool or a second TCI pool for the second CC, where the second CC uses a second mode that is different from the first mode.

In method 700, at Block 707, at least a subset of the one or more TCI pools (e.g., the first TCI pool or the second TCI pool) can be configured for the second CC, where the second CC uses a second mode that is different from the first mode. In an aspect, configuration applying component 352, e.g., in conjunction with processor(s) 312, memory 316, transceiver 302, UE communicating component 342, etc., can configure, for the second CC, at least a subset of the one or more TCI pools, where the second CC uses a second mode that is different from the first mode. For example, the first mode and second mode can each be associated with a number of TCI pools (e.g., a different number of TCI pools). In one example, in configuring at least the subset of the one or more TCI pools at Block 707, optionally at Block 708, at least one of the first TCI pool or a second TCI pool can be configured for the second CC based on the TCI pool configuration for the reference CC, where the second CC uses a second mode that is different from the first mode. In an aspect, configuration applying component 352, e.g., in conjunction with processor(s) 312, memory 316, transceiver 302, UE communicating component 342, etc., can configure, based on the TCI pool configuration for the reference CC, at least one of the first TCI pool or a second TCI pool for the second CC, where the second CC uses a second mode that is different from the first mode.

There may be some cases where the difference in modes between the CCs cause issues when using the TCI pool for the reference CC to configure the second CC. For example, where the mode for the reference CC is intra-cell only, the TCI pool configuration may not be used to configure the second CC for inter-cell BM, and configuring component 452 can accordingly avoid such configurations. In another example, where the mode for the reference CC is sTAG only, association between the TAG and TCI can be made via MAC-CE (e.g., a 1-to-1 mapping between CORESET pool and TAG ID), and as such, TCI state activating component 454 can include the association in the activation command.

For example, in method 800, optionally at Block 810, an activation command for the reference CC can be transmitted to activate a subset of TCI states in the TCI pool configuration, where the activation command indicates an association between the first TCI pool of the reference CC and a sTAG. In an aspect, configuring component 452, e.g., in conjunction with processor(s) 412, memory 416, transceiver 402, BS communicating component 442, etc., can transmit, for the reference CC, the activation command to activate the subset of TCI states in the TCI pool configuration, where the activation command indicates the association between the first TCI pool of the reference CC and the sTAG. For example, the activation command can be transmitted in a MAC-CE. In this example, TCI state activating component 454 can determine which TCI states to activate for a given CC based on the indication in the activation command. In another example, configuring component 452 can determine which TCI pool to use for the second CC (e.g., at Block 808) based on the indication in the activation command.

In method 700, optionally at Block 710, an activation command for the reference CC can be received to activate a subset of TCI states in the TCI pool configuration, where the activation command indicates an association between the first TCI pool of the reference CC and a sTAG. In an aspect, configuration applying component 352, e.g., in conjunction with processor(s) 312, memory 316, transceiver 302, UE communicating component 342, etc., can receive, for the reference CC, the activation command to activate the subset of TCI states in the TCI pool configuration, where the activation command indicates the association between the first TCI pool of the reference CC and the sTAG. For example, the activation command can be received in a MAC-CE. In this example, TCI state activating component 354 can determine which TCI states to activate for a given CC based on the indication in the activation command. In another example, configuration applying component 352 can determine which TCI pool to use for the second CC (e.g., at Block 708) based on the indication in the activation command.

In another example, the association between the TAG and TCI may be defined in the TCI pool configuration transmitted in RRC signaling (e.g., at Block 806) or received in RRC signaling (e.g., at Block 706). In this example, configuring component 452 can include this indication in the TCI pool configuration and/or configuration applying component 352 can determine the TCI pool for the TAG of the second CC based on the indication in the TCI pool configuration. In another example, configuring component 452 may not indicate a mTAG for the reference CC in the TCI pool configuration (at least where the second CC is associated with mTAG).

In an example, if a CC in a band is configured with inter-cell TCI (e.g., configured with additionalPCIlist in RRC for the CC), then the reference CC may not be configured with intra-cell TCI only pool. Thus, for example, configuring component 452 can refrain from configuring the TCI pool configuration for the reference CC as intra-cell (e.g., intra-cell mode) where the second CC is configured, or to be configured, with, or as, inter-cell (e.g., an inter-cell mode). When the linkage between TCI and TAG ID is configured in RRC, as described above, then if a CC in a band is configured with mTAG, the reference CC may not be configured with sTAG. In this example, where configuring component 452 configures the TCI and TAG association, it can refrain from configuring the reference CC with sTAG where the second CC is configured, or to be configured, with, or as, mTAG.

In another example, if a target CC in a band is configured with intra-cell TCI (e.g., configured with additionalPCIlist in RRC for the CC) and the reference BWP is configured with inter-cell TCI, then for the TCI configuration of the target CC, the TCIs associated with non-serving cell TCI can be ignored in applying the reference configuration. For example, where the TCI pool configuration for the reference CC includes multiple TCI pools and the second CC is configured in a mode related to a single TCI pool, configuration applying component 352 can ignore non-serving TCI pools in the TCI pool configuration and can apply the TCI pool corresponding to the second CC mode. A similar rule can be used for mTAG, such that configuration applying component 352 can ignore, for configuring the second CC, a second TAG configuration in the TCI pool configuration for the reference CC, if reference CC has multiple TAG TCIs, and the second CC has single TAG configuration.

In other examples, where there is mismatch between mTAG and sTAG, issues may be resolved based on how the TAG ID is linked to TCI. For example, where the TCI to TAG ID association is in the TCI pool configuration in RRC, a reference CC with sTAG (e.g., in a mode corresponding to sTRP, sDCI, or mDCI with sTAG) may not be used to configure a TCI pool in the second CC with mTAG. As described above, when a reference CC with mTAG is used to configure a TCI pool in the second CC with sTAG, then the TCI associated with second TAG can ignored. Where the TCI to TAG ID association is in MAC-CE or DCI, there may be no issue in the RRC configuration of TCI pools for the reference CC and second CC. Where the RRC configuration of TCI pools is per CC, there may be no issue for TCI pools for the reference CC and second CC.

Figure 9:
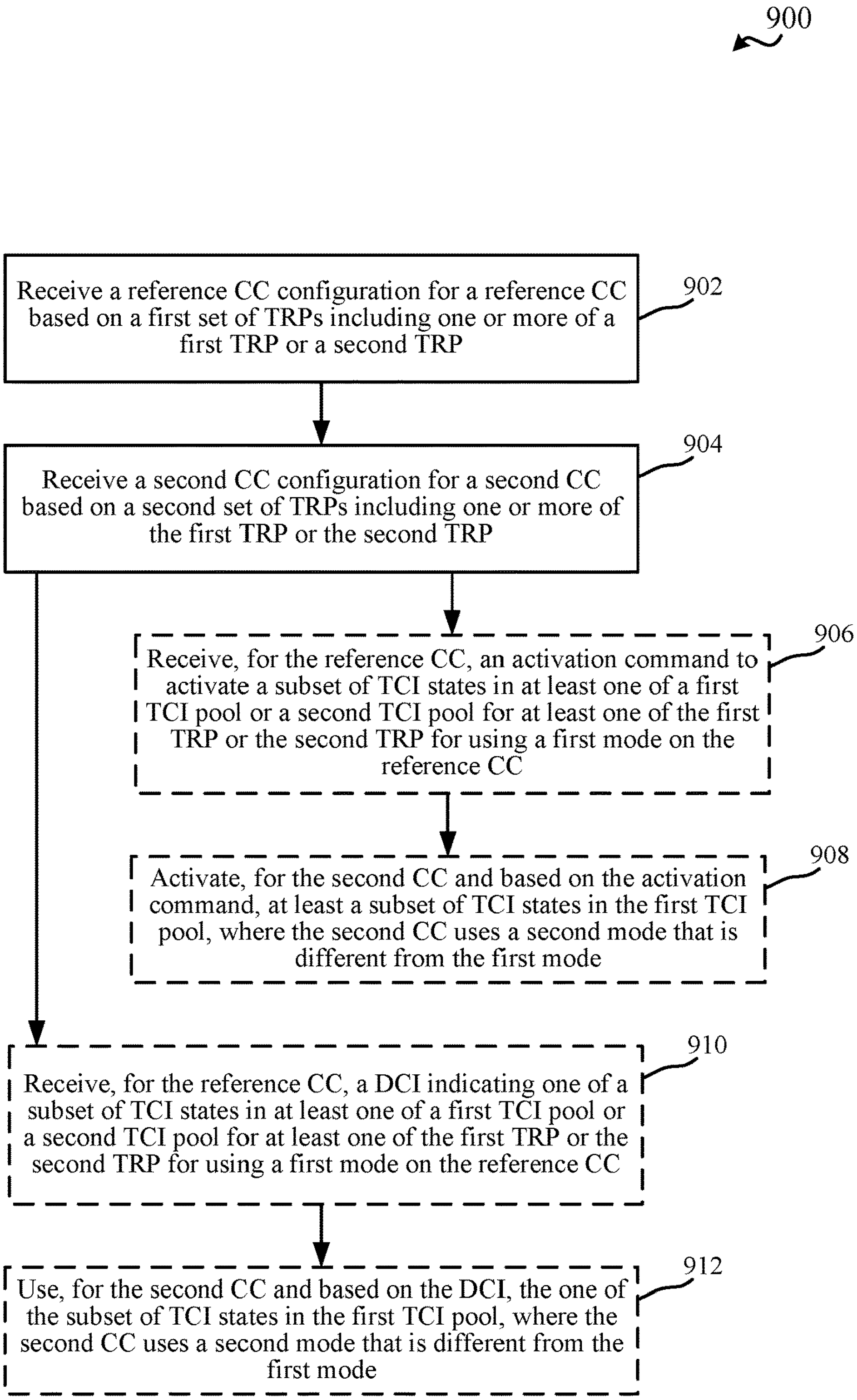
FIG. 9 is a flow chart illustrating an example of a method for receiving an activation command to activate TCI states for multiple CCs using different modes where a TCI state activation for one CC is used to activate TCI states for another CC, in accordance with aspects described herein.
Figure 10:
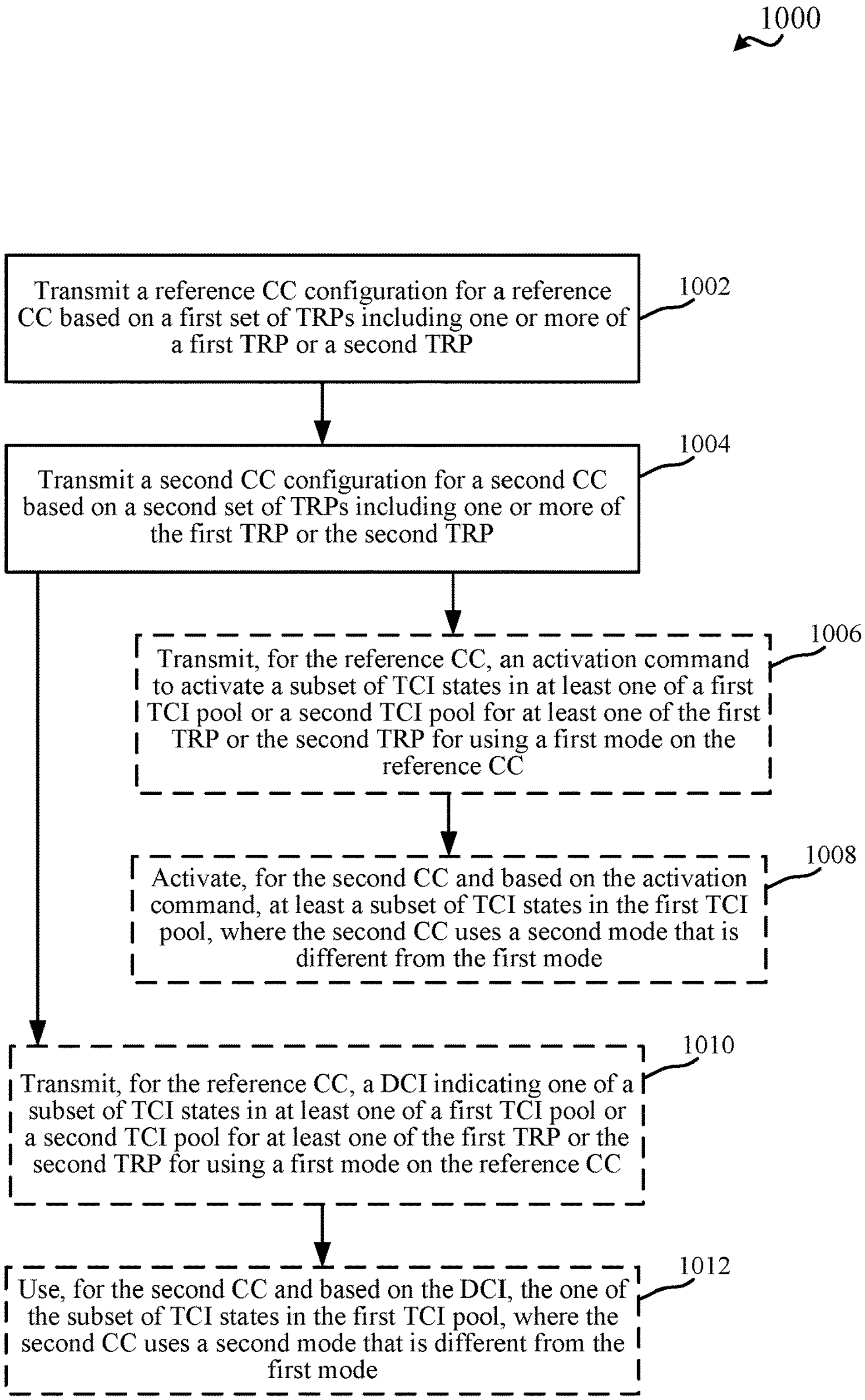
FIG. 10 is a flow chart illustrating an example of a method for transmitting an activation command to activate TCI states for multiple CCs using different modes where a TCI state activation for one CC is used to activate TCI states for another CC, in accordance with aspects described herein.

FIG. 9 illustrates a flow chart of an example of a method 900 for receiving an activation command to activate TCI states for multiple CCs using different modes where a TCI state activation for one CC is used to activate TCI states for another CC, in accordance with aspects described herein. FIG. 10 illustrates a flow chart of an example of a method 1000 for transmitting an activation command to activate TCI states for multiple CCs using different modes where a TCI state activation for one CC is used to activate TCI states for another CC, in accordance with aspects described herein. In an example, a UE 104 can perform the functions described in method 900 using one or more of the components described in FIGS. 1 and 3. In an example, a network node, such as a base station 102, a gNB, a monolithic base station or gNB, a portion of a disaggregated base station or gNB, etc.) can perform the functions described in method 1000 using one or more of the components described in FIGS. 1 and 4. Methods 900 and 1000 are described in conjunction with one another for ease of explanation; however, the methods 900 and 1000 are not required to be performed together and indeed can be performed independently using separate devices.

In method 1000, at Block 1002, a reference CC configuration for a reference CC based on a first set of TRPs including one or more of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the reference CC configuration for the reference CC based on the first set of TRPs including one or more of the first TRP or the second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be transmitted using RRC signaling.

In method 900, at Block 902, a reference CC configuration for a reference CC based on a first set of TRPs including one or more of a first TRP or a second TRP can be received. In an aspect, configuration applying component 352, e.g., in conjunction with processor(s) 312, memory 316, transceiver 302, UE communicating component 342, etc., can receive (e.g., from a base station 102) the reference CC configuration for the reference CC based on the first set of TRPs including one or more of the first TRP or the second TRP. For example, the reference CC configuration can configure a reference CC for the UE 104, where the reference CC may be configured over the first TRP and/or the second TRP, such that the UE 104 can transmit uplink communications to, and/or receive downlink communications from, the first TRP and/or the second TRP over the reference CC. For example, the reference CC configuration can be received over RRC signaling.

In method 1000, at Block 1004, a second CC configuration for a second CC based on a second set of TRPs including one or more of a first TRP or a second TRP can be transmitted. In an aspect, configuring component 452, e.g., in conjunction with processor(s) 412, memory 416, transceiver 402, BS communicating component 442, etc., can transmit (e.g., to a UE 104) the second CC configuration for the second CC based on the first set of TRPs including one or more of the first TRP or the second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be transmitted using RRC signaling.

In method 900, at Block 904, a second CC configuration for a second CC based on a first set of TRPs including one or more of a first TRP or a second TRP can be received. In an aspect, configuration applying component 352, e.g., in conjunction with processor(s) 312, memory 316, transceiver 302, UE communicating component 342, etc., can receive (e.g., from a base station 102) the second CC configuration for the second CC based on the first set of TRPs including one or more of the first TRP or the second TRP. For example, the second CC configuration can configure a second CC for the UE 104, in addition to the reference CC, where the second CC may be configured over the first TRP and/or the second TRP, such that the UE 104 can transmit uplink communications to, and/or receive downlink communications from, the first TRP and/or the second TRP over the second CC. For example, the second CC configuration can be received over RRC signaling.

For example, the reference CC and the second CC can be configured over different frequency bands or subbands. As described above, the reference CC and the second CC may be configured in different modes, which can relate to different TCI pool configurations. For example, the reference CC and second CC may each be configured with a mode that may include intra-cell sTRP, inter-cell sTRP, intra-cell sDCI, intra-cell mDCI sTAG, intra-cell mDCI mTAG, inter-cell mDCI sTAG, inter-cell mDCI mTAG, etc. In this regard, for example, one CC may be mTRP while the other CC is sTRP, or one CC may use sDCI while the other CC uses mDCI, or one CC may use sTAG while the other CC uses mTAG, etc. This can present some potential issues for activating a subset of TCI states indicated in configured TCI pools or otherwise indicating or using a TCI state from the activated subset (e.g., in DCI), as described herein.

In method 1000, optionally at Block 1006, an activation command to activate a subset of TCI states in at least one of a first TCI pool or a second TCI pool for at least one of the first TRP or second TRP can be transmitted for the reference CC for using a first mode on the reference CC. In an aspect, TCI state activating component 454, e.g., in conjunction with processor(s) 412, memory 416, transceiver 402, BS communicating component 442, etc., can transmit (e.g., to a UE 104), for the reference CC, the activation command to activate the subset of TCI states in at least one of the first TCI pool or the second TCI pool for at least one of the first TRP or the second TRP for using the first mode on the reference CC. In method 900, optionally at Block 906, an activation command to activate a subset of TCI states in at least one of a first TCI pool or a second TCI pool for at least one of the first TRP or second TRP can be received for the reference CC for using a first mode on the reference CC. In an aspect, TCI state activating component 454, e.g., in conjunction with processor(s) 412, memory 416, transceiver 402, BS communicating component 442, etc., can receive (e.g., from the base station 102), for the reference CC, the activation command to activate the subset of TCI states in at least one of the first TCI pool or the second TCI pool for at least one of the first TRP or the second TRP for using the first mode on the reference CC.

In an example, the activation command can be transmitted in a MAC-CE to downselect a portion of the TCI states in the TCI pool(s). In addition, in an example, the second CC can be configured with a different number of TCI pools than the reference CC, based on the mode, which can impact activation of TCI states for the second CC where the reference CC and the second CC are in a list for joint or cross CC TCI state activation. TCI state activating component 354 and/or TCI state activating component 454 can activate TCI states for the second CC based on the activation command that corresponds to the reference CC based on one or more rules described herein.

In method 1000, optionally at Block 1008, at least a subset of TCI states in the first TCI pool can be activated for the second CC and based on the activation command where the second CC uses a second mode that is different from the first mode. In an aspect, TCI state activating component 454, e.g., in conjunction with processor(s) 412, memory 416, transceiver 402, BS communicating component 442, etc., can activate, for the second CC and based on the activation command, at least the subset of TCI states in the first TCI pool, where the second CC uses a second mode that is different from the first mode. In method 900, optionally at Block 908, at least a subset of TCI states in the first TCI pool can be activated for the second CC and based on the activation command where the second CC uses a second mode that is different from the first node. In an aspect, TCI state activating component 454, e.g., in conjunction with processor(s) 412, memory 416, transceiver 402, BS communicating component 442, etc., can activate, for the second CC and based on the activation command, at least the subset of TCI states in the first TCI pool, where the second CC uses a second mode that is different from the first mode.

In one example, there may be a MAC-CE mismatch issue (assuming TCI pools are already configured in the CCs). For example, a sDCI MAC-CE format (e.g., for the reference CC) may not directly apply to activate TCIs in a mDCI CC (e.g., the second CC). In general, there may not be an issue between inter-cell BM cell and intra-cell BM cell, as long as their MAC-CE formats are the same. For example, sTRP inter-cell and sTRP intra-cell may use the same MAC-CE format to activate TCI from their TCI lists. MAC-CE may include a list of TCI IDs, while the same TCI ID may refer to different TCIs in different cells.

In another example, in the same CC list, CCs with different modes which may cause conflicts may not be configured with a cross CC activation command. For example, it may not be possible to configure a CC of sTRP and CC of mTRP modes in the same CC, unless the reference CC is sTRP and the second CC using the reference CC activation command is mTRP. In one example, as described, mTRP MAC-CE can be applied to sTRP CC by ignoring activation for TCI from second CORESET pool/TAG. TCI state activating component 354 and/or TCI state activating component 354 can accordingly activate the TCI states for the second CC based on such considerations.

Similar considerations can be used for indicating and using a TCI state for a certain resource grant (e.g., as indicated in DCI). For example, in method 1000, optionally at Block 1010, a DCI indicating one of a subset of TCI states in at least one of a first TCI pool or a second TCI pool for at least one of the first TRP or second TRP can be transmitted for the reference CC for using a first mode on the reference CC. In an aspect, TCI state activating component 454, e.g., in conjunction with processor(s) 412, memory 416, transceiver 402, BS communicating component 442, etc., can transmit (e.g., to a UE 104), for the reference CC, the DCI indicating one of the subset of TCI states in at least one of the first TCI pool or the second TCI pool for at least one of the first TRP or the second TRP for using the first mode on the reference CC. In method 900, optionally at Block 910, a DCI indicating one of a subset of TCI states in at least one of a first TCI pool or a second TCI pool for at least one of the first TRP or second TRP can be received for the reference CC for using a first mode on the reference CC. In an aspect, TCI state activating component 454, e.g., in conjunction with processor(s) 412, memory 416, transceiver 402, BS communicating component 442, etc., can receive (e.g., from the base station 102), for the reference CC, the DCI indicating the one of the subset of TCI states in at least one of the first TCI pool or the second TCI pool for at least one of the first TRP or the second TRP for using the first mode on the reference CC.

In an example, the DCI can be transmitted from a network node to a UE to grant resources for communications and can indicate one TCI state in each of one or more subsets of TCI states that can be used for the communications. In addition, in an example, the second CC can be configured with a different number of TCI pools than the reference CC, based on the mode, which can impact indication of TCI states for the second CC where the reference CC and the second CC are in a list for joint or cross CC TCI state indication. TCI state component 356 and/or TCI state indicating component 456 can use a TCI state in DCI for the second CC based on the DCI indication that corresponds to the reference CC based on one or more rules described herein.

In method 1000, optionally at Block 1012, the one of the subset of TCI states in the first TCI pool can be used for the second CC and based on the DCI where the second CC uses a second mode that is different from the first mode. In an aspect, TCI state activating component 454, e.g., in conjunction with processor(s) 412, memory 416, transceiver 402, BS communicating component 442, etc., can use, for the second CC and based on the DCI, the one of the subset of TCI states in the first TCI pool, where the second CC uses a second mode that is different from the first mode. In method 1000, optionally at Block 1012, the one of the subset of TCI states in the first TCI pool can be used for the second CC and based on the DCI where the second CC uses a second mode that is different from the first node. In an aspect, TCI state activating component 454, e.g., in conjunction with processor(s) 412, memory 416, transceiver 402, BS communicating component 442, etc., can use, for the second CC and based on the DCI, at least the one of the subset of TCI states in the first TCI pool, where the second CC uses a second mode that is different from the first mode.

For example, in using the one of the subset of TCI states at Block 912 and/or 1012, various rules can apply to determine how to indicate or use the TCI state based on the modes of the reference CC and the second CC. In an example, the rules can be defined in a wireless communication technology standard, such as 5G NR, and may be implemented in the network node and/or UE 104. For example, to resolve mismatch between mTAG and sTAG for the reference CC and second CC, rules can be defined or used based on how the TAG ID is linked to TCI. For example, if TCI is linked to TAG ID in RRC configuration of TCI pools, there may be no issue for MAC-CE activation, as the activation command can indicate the TAG ID, which can be resolved to the associated TCI pool(s) for the TAG per CC. In another example, if TCI is linked to TAG ID individually in MAC-CE, e.g a TAG ID is associated with each TCI ID in the MAC-CE for mTAG activation, when the second CC is sTAG, and the reference CC to apply the same update is mTAG, this may not be resolved. When target CC is mTAG, and the reference CC to apply the same update is sTAG, TCI state activating component 354 and/or TCI state activating component 454 can ignore the activation in the command related to the second TAG ID when activating TCI states for the second CC.

In another example, if TAG ID is pre-linked to CORESET pool ID, and CORESET pool ID is indicated in MAC-CE, the current rule may apply as long as sTRP cell ignore the linkage between TAG ID and CORESET pool ID. The base station 102, however, may not want to operate in such a manner, and as such, TCI of same ID activated in different cells may corresponds to different Rx filters. In another example, if TCI is linked to TAG ID in DCI, when second CC is sTAG, and the reference CC to apply the same update is mTAG, this may not be resolved. When target CC is mTAG, and the reference CC to apply the same update is sTAG, TCI state component 356 and/or TCI state indicating component 456 may ignore any TCI indication of mTAG TCI in the DCI for the reference CC when using the indicated TCI state for the second CC.

In one example, TCI state activating component 354 and/or TCI state activating component 454 may apply mDCI to sDCI translation rule for MAC-CE activation for activating a subset of TCI states for a second CC based on an activation command received for a reference CC. For example, the activation MAC-CE of n-th TCI from m-th CORESET pool in mDCI CC (the reference CC) in the activation command can update the m-th TCI in the n-th TCI codepoint in the sDCI CC (the second CC). If the mDCI activation MAC-CE from m-th CORESET pool only contains N TCIs, then reserved index (indicating no TCI from the TRP) can be filled in for m-th TCI in the n-th TCI codepoint with n>N in the activation command. If mDCI CC is for mTAG, then sDCI may ignore the TCI codepoint which contain a TCI associated with second TAG.

In one example, TCI state component 356 and/or TCI state indicating component 456 may apply mDCI to sDCI translation rule for DCI indicating for using or indicating one TCI state of a subset of TCI states for a second CC based on DCI indication received for a reference CC. For example, only the TCI indication for CORESET pool 0 in mDCI CC (reference CC) may be applied to sDCI CC (second CC). In another example, for sDCI CC, the indicated TCI in sDCI CC can be a floating TCI codepoint, which is outside the TCI list activated by MAC-CE. When TCI indication X is from mDCI CC, m-th CORESET pool, the m-th TCI in the floating TCI codepoint can be updated to the corresponding TCI (e.g. m-th TCI in the X-th TCI codepoint). When TCI indication X is from sDCI CC itself, the floating TCI codepoint can be updated to X-th TCI codepoint in sDCI CC. There may or may not be translation rules to translate mDCI to sDCI.

In one example, an MAC-CE may activate TCIs corresponding to a TRP or CORESET in mTRP case, e.g. mTRP mDCI case. If TCI state activating component 454 transmits, and/or TCI state activating component 354 receives, an activation command in MAC-CE that activates a single TCI for the TRP, then the TCI state indicating component 456, and/or TCI state component 356, can autonomously apply single TCI to applicable channel after a period of time (e.g., 3 milliseconds) from receiving the MAC-CE. In this case, there may be no need to use a DCI to downselect the TCI, as there is no need to downselect a TCI from a list of a single TCI candidate. In this example, using the one of the subset of TCI states at Block 912 or 1012 can include using the one of the subset of TCI states after the period of time where the subset has only the one TCI state.

Figure 11:
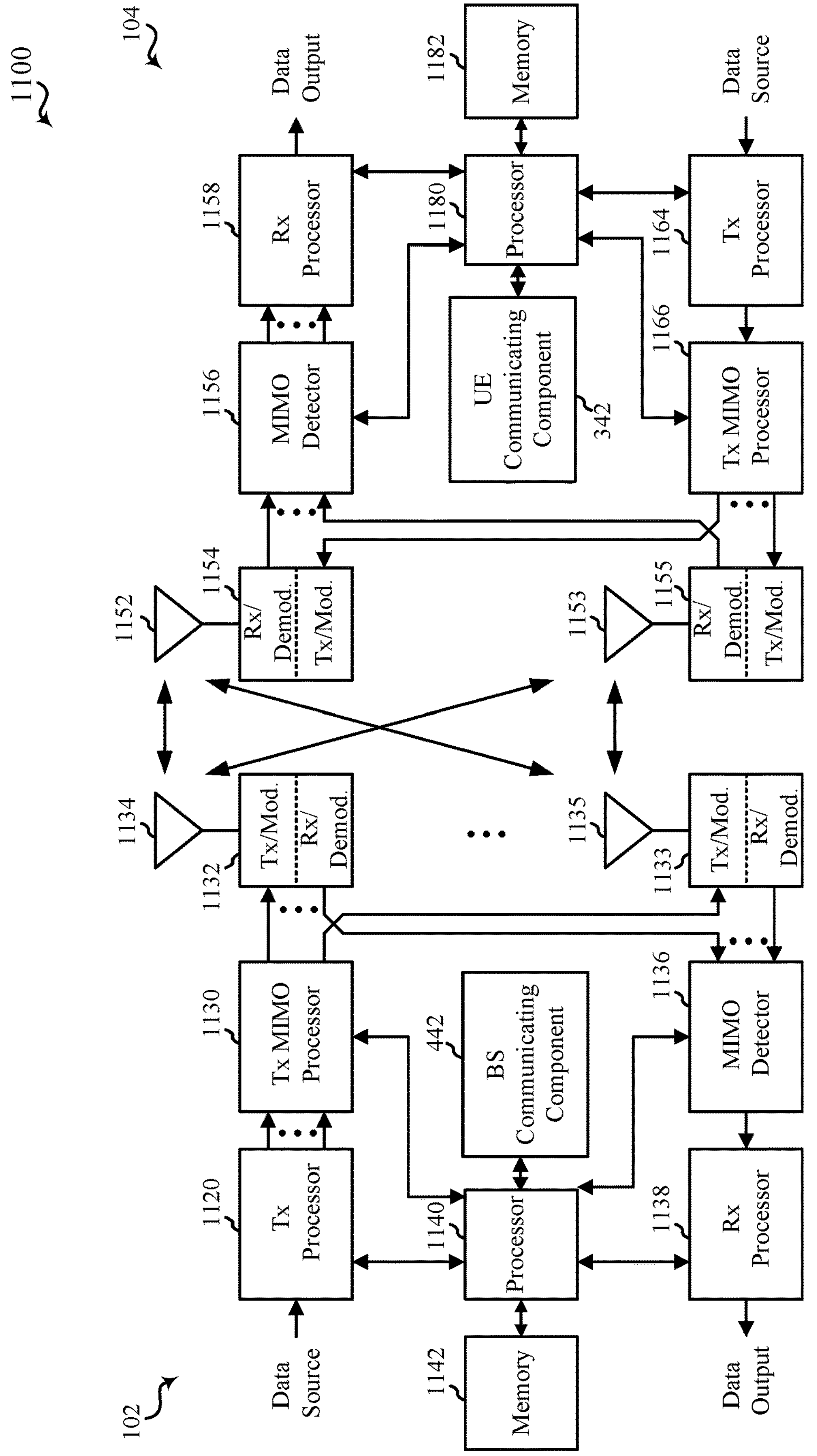
FIG. 11 is a block diagram illustrating an example of a multiple-input multiple-output (MIMO) communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 3. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a UE communicating component 342 (see e.g., FIGS. 1 and 3).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for single carrier-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communication at a UE including receiving a reference CC configuration for a reference CC based on a first set of TRPs including one or more of a first TRP or a second TRP, receiving a second CC configuration for a second CC based on a second set of TRPs including one or more of the first TRP or the second TRP, receiving, for the reference CC, a TCI pool configuration for using the reference CC in a first mode, where the TCI pool configuration includes one or more TCI pools for at least one of the first TRP or the second TRP, and where the second CC is used in a second mode associated with a different number of TCI pools than the first mode for using the reference CC, configuring the second CC, based on the second mode, with a subset of the one or more TCI pools.

In Aspect 2, the method of Aspect 1 includes where the first mode relates to using multiple TCI pools, where the second mode is associated with one TCI pool in the subset of TCI pools, and where configuring the second CC includes configuring the second CC, based on the TCI pool configuration received for the reference CC, with the one TCI pool.

In Aspect 3, the method of any of Aspects 1 or 2 includes receiving an activation command to activate a subset of TCI states from each of a set of multiple TCI pools for the reference CC, where the TCI pool configuration for the first mode includes the multiple TCI pools, and activating, for the second CC and based on the activation command, at least a portion of the subset of TCI states that are from the one TCI pool, where the second CC is configured with only the one TCI pool.

In Aspect 4, the method of Aspect 3 includes receiving, for the second CC, a second TCI pool configuration including only the one TCI pool for the second mode, where configuring the second CC includes configuring the second CC with only the one TCI pool.

In Aspect 5, the method of any of Aspects 3 or 4 includes where the activation command indicates a mode change for at least one of the reference CC modifying the number of TCI pools configured for the reference CC, or the second CC modifying the number of TCI pools configured for the second CC.

In Aspect 6, the method of any of Aspects 3 to 5 includes where the reference CC is configured for inter-cell beam management based on at least one of the reference CC or the second CC being configured for inter-cell beam management.

In Aspect 7, the method of any of Aspects 1 to 6 includes where the reference CC is configured for mTAG based on at least one of the reference CC or the second CC being configured for mTAG.

In Aspect 8, the method of any of Aspects 1 to 7 includes where the reference CC is configured with multiple TCI pool configurations for the reference CC, and where receiving the TCI pool configuration includes selecting, for the reference CC, the TCI pool configuration from the multiple TCI pool configurations.

Aspect 9 is a method for wireless communication at a network node including transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, a TCI pool configuration for using the reference CC in a first mode, where the TCI pool configuration includes one or more TCI pools for at least one of the first TRP or the second TRP, and where the second CC is used in a second mode associated with a different number of TCI pools than the first mode for using the reference CC, configuring the second CC, based on the second mode, with a subset of the one or more TCI pools.

In Aspect 10, the method of Aspect 9 includes where the first mode relates to using multiple TCI pools, where the second mode is associated with one TCI pool in the subset of TCI pools, and where configuring the second CC includes configuring the second CC, based on the TCI pool configuration received for the reference CC, with the one TCI pool.

In Aspect 11, the method of any of Aspects 9 or 10 includes transmitting an activation command to activate a subset of TCI states from each of a set of multiple TCI pools for the reference CC, where the TCI pool configuration for the first mode includes the multiple TCI pools, and activating, for the second CC and based on the activation command, at least a portion of the subset of TCI states that are from the one TCI pool, where the second CC is configured with only the one TCI pool.

In Aspect 12, the method of Aspect 11 includes transmitting, for the second CC, a second TCI pool configuration including only the one TCI pool for the second mode, where configuring the second CC includes configuring the second CC with only the one TCI pool.

In Aspect 13, the method of any of Aspects 11 or 12 includes refraining from including, in the activation command, a first set of one or more TCI states associated with a first set of multiple TRPs where a second set of one or more TCI states in the activation command is associated with a second set of at least one TRP.

In Aspect 14, the method of any of Aspects 11 to 13 includes refraining from transmitting multiple DCI for TCI state indication for a first set of TCI states associated with a first set of multiple TRPs that indicates a TCI state for a second set of at least one TRP that uses a single DCI for TCI state indication.

In Aspect 15, the method of any of Aspects 11 to 14 includes where the activation command indicates a mode change for at least one of the reference CC modifying the number of TCI pools configured for the reference CC, or the second CC modifying the number of TCI pools configured for the second CC.

In Aspect 16, the method of any of Aspects 9 to 15 includes where the reference CC is configured for inter-cell beam management based on at least one of the reference CC or the second CC being configured for inter-cell beam management.

In Aspect 17, the method of any of Aspects 9 to 16 includes where the reference CC is configured for mTAG based on at least one of the reference CC or the second CC being configured for mTAG.

In Aspect 18, the method of any of Aspects 9 to 17 includes where the reference CC is configured with multiple TCI pool configurations for the reference CC, and where transmitting the TCI pool configuration includes selecting, for the reference CC, the TCI pool configuration from the multiple TCI pool configurations.

Aspect 19 is a method for wireless communication at a UE including receiving a reference CC configuration for a reference CC based on a first set of TRPs including at least one of a first TRP or a second TRP, receiving a second CC configuration for a second CC based on a second set of TRPs including at least one of the first TRP or the second TRP, receiving, for the reference CC, a TCI pool configuration for using the reference CC in a first mode, where the TCI pool configuration includes at least one of a first TCI pool or a second TCI pool for at least one of the first TRP or the second TRP, and configuring, based on the TCI pool configuration for the reference CC, at least one of the first TCI pool or the second TCI pool for the second CC, where the second CC uses a second mode that is different from the first mode.

In Aspect 20, the method of Aspect 19 includes receiving, for the reference CC, an activation command to activate a subset of TCI states in the TCI pool configuration, where the activation command indicates an association between the first TCI pool of the reference CC and a single TAG, where configuring at least one of the first TCI pool or the second TCI pool for the second CC includes configuring the first TCI pool for the second CC based on the association.

In Aspect 21, the method of any of Aspects 19 or 20 includes where the TCI pool configuration includes the first TCI pool and the second TCI pool for the reference CC, and where configuring at least one of the first TCI pool or the second TCI pool for the second CC includes configuring the first TCI pool where the second mode is associated with intra-cell TCI.

In Aspect 22, the method of any of Aspects 19 to 21 includes where the TCI pool configuration including the first TCI pool for the reference CC is based on the second mode using only one TCI pool or with only an association between the first TCI pool of the second CC and a single TAG.

In Aspect 23, the method of any of Aspects 19 to 22 includes where the TCI pool configuration includes the first TCI pool and the second TCI pool for the reference CC, and where configuring at least one of the first TCI pool or the second TCI pool for the second CC includes configuring the first TCI pool where the second mode is associated with a single TAG.

Aspect 24 is a method for wireless communication at a network node including transmitting a reference CC configuration for a reference CC based on a first set of TRPs including at least one of a first TRP or a second TRP, transmitting a second CC configuration for a second CC based on a second set of TRPs including at least one of the first TRP or the second TRP, transmitting, for the reference CC, a TCI pool configuration for using the reference CC in a first mode, where the TCI pool configuration includes at least one of a first TCI pool or a second TCI pool for at least one of the first TRP or the second TRP, and configuring, based on the TCI pool configuration for the reference CC, at least one of the first TCI pool or the second TCI pool for the second CC, where the second CC uses a second mode that is different from the first mode.

In Aspect 25, the method of Aspect 24 includes transmitting, for the reference CC, an activation command to activate a subset of TCI states in the TCI pool configuration, where the activation command indicates an association between the first TCI pool of the reference CC and a single TAG, where configuring at least one of the first TCI pool or the second TCI pool for the second CC includes configuring the first TCI pool for the second CC based on the association.

In Aspect 26, the method of any of Aspects 24 or 25 includes where the TCI pool configuration includes the first TCI pool and the second TCI pool for the reference CC, and where configuring at least one of the first TCI pool or the second TCI pool for the second CC includes configuring the first TCI pool where the second mode is associated with intra-cell TCI.

In Aspect 27, the method of any of Aspects 24 or 26 includes where the TCI pool configuration including the first TCI pool for the reference CC is based on the second mode using only one TCI pool or with only an association between the first TCI pool of the second CC and a single TAG.

In Aspect 28, the method of any of Aspects 24 to 27 includes where the TCI pool configuration includes the first TCI pool and the second TCI pool for the reference CC, and where configuring at least one of the first TCI pool or the second TCI pool for the second CC includes configuring the first TCI pool where the second mode is associated with a single TAG.

Aspect 29 is a method for wireless communication at a UE including receiving a reference CC configuration for a reference CC based on a first set of TRPs including one or more of a first TRP or a second TRP, receiving a second CC configuration for a second CC based on a second set of TRPs including one or more of the first TRP or the second TRP, receiving, for the reference CC, an activation command to activate a subset of TCI states in at least one of a first TCI pool or a second TCI pool for at least one of the first TRP or the second TRP for using a first mode on the reference CC, and activating, for the second CC and based on the activation command, at least a subset of TCI states in the first TCI pool, where the second CC uses a second mode that is different from the first mode.

In Aspect 30, the method of Aspect 29 includes where the activation command indicates to activate a subset of TCI states in both of the first TCI pool and the second TCI pool based on the reference CC being configured with the first TCI pool and the second TCI pool, and where activating at least the subset of TCI states for the second CC includes only the TCI states indicated in the activation command that are in the first TCI pool.

In Aspect 31, the method of any of Aspects 29 or 30 includes where the activation command indicates to activate a subset of TCI states in both of the first TCI pool and the second TCI pool based on the activation command indicating the reference CC being configured with mTAG for the first TRP and the second TRP, and where activating at least the subset of TCI states for the second CC includes only the TCI states indicated in the activation command that are in the first TCI pool.

In Aspect 32, the method of any of Aspects 29 to 31 includes where activating at least the subset of TCI states in the first TCI pool is based on translating a code point from the activation command indicated for the reference CC to the subset of TCI states in the first TCI pool for the second CC.

In Aspect 33, the method of any of Aspects 29 to 32 includes where the activation command indicates to activate one TCI state in the TCI pool configuration, applying, after a period of time, the one of the TCI states for use in communications over at least one of the reference CC or the second CC.

Aspect 34 is a method for wireless communication at a network node including transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, an activation command to activate a subset of TCI states in at least one of a first TCI pool or a second TCI pool for at least one of the first TRP or the second TRP for using a first mode on the reference CC, and activating, for the second CC and based on the activation command, at least a subset of TCI states in the first TCI pool, where the second CC uses a second mode that is different from the first mode.

In Aspect 35, the method of Aspect 34 includes where the activation command indicates to activate a subset of TCI states in both of the first TCI pool and the second TCI pool based on the reference CC being configured with the first TCI pool and the second TCI pool, and where activating at least the subset of TCI states for the second CC includes only the TCI states indicated in the activation command that are in the first TCI pool.

In Aspect 36, the method of any of Aspects 34 or 35 includes where the activation command indicates to activate a subset of TCI states in both of the first TCI pool and the second TCI pool based on the activation command indicating the reference CC being configured with mTAG for the first TRP and the second TRP, and where activating at least the subset of TCI states for the second CC includes only the TCI states indicated in the activation command that are in the first TCI pool.

In Aspect 37, the method of Aspect 34 includes where activating at least the subset of TCI states in the first TCI pool is based on translating a code point from the activation command indicated for the reference CC to the subset of TCI states in the first TCI pool for the second CC.

In Aspect 38, the method of any of Aspects 34 or 35 includes where the activation command indicates to activate one TCI state in the TCI pool configuration, applying, after a period of time, the one of the TCI states for use in communications over at least one of the reference CC or the second CC.

Aspect 39 is a method for wireless communication at a UE including receiving a reference CC configuration for a reference CC based on a first set of TRPs including one or more of a first TRP or a second TRP, receiving a second CC configuration for a second CC based on a second set of TRPs including one or more of the first TRP or the second TRP, receiving, for the reference CC, DCI indicating one of a subset of TCI states in a first TCI pool or a second TCI pool to use for at least one of the first TRP or the second TRP for using a first mode on the reference CC, and using, for the second CC and based on the DCI, the one of the subset of TCI states in the first TCI pool, where the second CC uses a second mode that is different from the first mode.

In Aspect 40, the method of Aspect 39 includes where the DCI indicates the one of the subset of TCI states in the first TCI pool and the one of the subset of TCI states in the second TCI pool based on the DCI indicating the reference CC being configured with mTAG for the first TRP and the second TRP, and where using the one of the subset of TCI states in the first TCI pool for the second CC is based on only the one of the subset of TCI states in the first TCI pool as indicated in the DCI.

In Aspect 41, the method of any of Aspects 39 or 40 includes where using the one of the subset of TCI states for the second CC is based on translating a code point from the DCI indicated for the reference CC to the one of the subset of TCI states in the first TCI pool for the second CC.

Aspect 42 is a method for wireless communication at a network node including transmitting a reference CC configuration for a reference CC based on a first set of TRPs including one or more of a first TRP or a second TRP, transmitting a second CC configuration for a second CC based on a second set of TRPs including one or more of the first TRP or the second TRP, transmitting, for the reference CC, DCI indicating one of a subset of TCI states in a first TCI pool or a second TCI pool to use for the first TRP or the second TRP for using a first mode on the reference CC, and using, for the second CC and based on the DCI, the one of the subset of TCI states in the first TCI pool, where the second CC uses a second mode that is different from the first mode.

In Aspect 43, the method of Aspect 42 includes where the DCI indicates the one of the subset of TCI states in the first TCI pool and the one of the subset of TCI states in the second TCI pool based on the DCI indicating the reference CC being configured with mTAG for the first TRP and the second TRP, and where using the one of the subset of TCI states in the first TCI pool for the second CC is based on only the one of the subset of TCI states in the first TCI pool as indicated in the DCI.

In Aspect 44, the method of any of Aspects 42 or 43 includes where using the one of the subset of TCI states for the second CC is based on translating a code point from the DCI indicated for the reference CC to the one of the subset of TCI states in the first TCI pool for the second CC.

Aspect 45 is an apparatus for wireless communication including a processor, memory coupled with the processor, and instructions stored in the memory and operable, when executed by the processor, to cause the apparatus to perform any of the methods of Aspects 1 to 44.

Aspect 46 is an apparatus for wireless communication including means for performing any of the methods of Aspects 1 to 44.

Aspect 47 is a computer-readable medium including code executable by one or more processors for wireless communications, the code including code for performing any of the methods of Aspects 1 to 44.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:

a transceiver;

a memory configured to store instructions; and one or more processors communicatively coupled with the memory and the transceiver, wherein the one or more processors are configured to execute the instructions to cause the apparatus to:

receive a reference component carrier (CC) configuration for a reference CC based on a first set of transmission/reception points (TRPs) including one or more of a first TRP or a second TRP;

receive a second CC configuration for a second CC based on a second set of TRPs including one or more of the first TRP or the second TRP;

receive, for the reference CC, a transmission configuration indicator (TCI) pool configuration for using the reference CC in a first mode, wherein the TCI pool configuration includes one or more TCI pools for at least one of the first TRP or the second TRP; and configure, for the second CC, at least a subset of one of the one or more TCI pools, wherein the second CC uses a second mode that is different from the first mode, wherein the first mode and the second mode are each associated with a number of TCI pools, and wherein configuring at least the subset of one of the one or more TCI pools for the second CC is based on the first mode being associated with multiple downlink control information (DCI) and the second mode not being associated with single DCI.

2. The apparatus of claim 1, wherein the second mode is associated with a different number of TCI pools than the first mode for using the reference CC.

3. The apparatus of claim 2, wherein the first mode relates to using multiple TCI pools, wherein the second mode is associated with one TCI pool in at least the subset of TCI pools, and wherein the one or more processors are configured to execute the instructions to cause the apparatus to configure the second CC, based on the TCI pool configuration received for the reference CC, with the one TCI pool.

4. The apparatus of claim 1, wherein the one or more processors are configured to execute the instructions to cause the apparatus to:

receive an activation command to activate a subset of TCI states from each of a set of multiple TCI pools for the reference CC, wherein the TCI pool configuration for the first mode includes the multiple TCI pools; and activate, for the second CC and based on the activation command, at least a portion of the subset of TCI states that are from the one TCI pool, wherein the second CC is configured with only the one TCI pool.

5. The apparatus of claim 4, wherein the one or more processors are configured to execute the instructions to cause the apparatus to receive, for the second CC, a second TCI pool configuration including only the one TCI pool for the second mode, wherein the one or more processors are configured to execute the instructions to cause the apparatus to configure the second CC with only the one TCI pool.

6. The apparatus of claim 4, wherein the activation command indicates a mode change for at least one of the reference CC modifying the number of TCI pools associated with the mode configured for the reference CC, or the second CC modifying the number of TCI pools associated with the mode configured for the second CC.

7. The apparatus of claim 1, wherein the reference CC is configured for inter-cell beam management based on at least one of the reference CC or the second CC being configured for inter-cell beam management.

8. The apparatus of claim 1, wherein the reference CC is configured for multi-timing advance group (TAG) based on at least one of the reference CC or the second CC being configured for mTAG.

9. The apparatus of claim 1, wherein the reference CC is configured with multiple TCI pool configurations for the reference CC, and wherein the one or more processors are configured to execute the instructions to cause the apparatus to receive the TCI pool configuration at least in part by selecting, for the reference CC, the TCI pool configuration from the multiple TCI pool configurations.

10. The apparatus of claim 1, wherein the one or more TCI pools includes at least one of a first TCI pool or a second TCI pool for at least one of the first TRP or the second TRP; and wherein the one or more processors are configured to execute the instructions to cause the apparatus to configure, for the second CC, at least the subset of one of the one or more TCI pools at least in part by configuring, based on the TCI pool configuration for the reference CC, at least one of the first TCI pool or the second TCI pool for the second CC.

11. The apparatus of claim 10, wherein the one or more processors are configured to execute the instructions to cause the apparatus to receive, for the reference CC, an activation command to activate a subset of TCI states in the TCI pool configuration, wherein the activation command indicates an association between the first TCI pool of the reference CC and a single timing advance group (TAG), wherein the one or more processors are configured to execute the instructions to cause the apparatus to configure at least one of the first TCI pool or the second TCI pool for the second CC at least in part by configuring the first TCI pool for the second CC based on the association.

12. The apparatus of claim 10, wherein the TCI pool configuration includes the first TCI pool and the second TCI pool for the reference CC, and wherein the one or more processors are configured to execute the instructions to cause the apparatus to configure at least one of the first TCI pool or the second TCI pool for the second CC at least in part by configuring the first TCI pool where the second mode is associated with intra-cell TCI.

13. The apparatus of claim 10, wherein the TCI pool configuration including the first TCI pool for the reference CC is based on the second mode using only one TCI pool or with only an association between the first TCI pool of the second CC and a single timing advance group (TAG).

14. The apparatus of claim 10, wherein the TCI pool configuration includes the first TCI pool and the second TCI pool for the reference CC, and wherein the one or more processors are configured to execute the instructions to cause the apparatus to configure at least one of the first TCI pool or the second TCI pool for the second CC at least in part by configuring the first TCI pool where the second mode is associated with a single timing advance group (TAG).

15. An apparatus for wireless communication, comprising:

a transceiver;

a memory configured to store instructions; and one or more processors communicatively coupled with the memory and the transceiver, wherein the one or more processors are configured to execute the instructions to cause the apparatus to:

receive a reference component carrier (CC) configuration for a reference CC based on a first set of transmission/reception points (TRPs) including one or more of a first TRP or a second TRP;

receive a second CC configuration for a second CC based on a second set of TRPs including one or more of the first TRP or the second TRP;

receive, for the reference CC, an activation command to activate a subset of transmission configuration indicator (TCI) states in at least one of a first TCI pool or a second TCI pool for at least one of the first TRP or the second TRP for using a first mode on the reference CC, wherein the activation command indicates to activate a subset of TCI states in both of the first TCI pool and the second TCI pool based on the reference CC being configured with the first TCI pool and the second TCI pool; and activate, for the second CC and based on the activation command, at least a subset of TCI states in the first TCI pool, wherein the second CC uses a second mode that is different from the first mode, wherein activate at least the subset of TCI states for the second CC including only the TCI states indicated in the activation command that are in the first TCI pool.

16. The apparatus of claim 15, wherein the activation command indicates to activate a subset of TCI states in both of the first TCI pool and the second TCI pool based on the activation command indicating the reference CC being configured with multi-timing advance group (TAG) for the first TRP and the second TRP, and wherein the one or more processors are configured to execute the instructions to cause the apparatus to activate at least the subset of TCI states for the second CC including only the TCI states indicated in the activation command that are in the first TCI pool.

17. The apparatus of claim 15, wherein the one or more processors are configured to execute the instructions to cause the apparatus to activate at least the subset of TCI states in the first TCI pool based on translating a code point from the activation command indicated for the reference CC to the subset of TCI states in the first TCI pool for the second CC.

18. The apparatus of claim 15, wherein the one or more processors are configured to execute the instructions to cause the apparatus to, where the activation command indicates to activate one TCI state in the TCI pool configuration, apply, after a period of time, the one of the TCI states for use in communications over at least one of the reference CC or the second CC.

19. The apparatus of claim 15, wherein the one or more processors are configured to execute the instructions to cause the apparatus to:

receive, for the reference CC, downlink control information (DCI) indicating one of the subset of TCI states in the first TCI pool or the second TCI pool to use for at least one of the first TRP or the second TRP for using the first mode on the reference CC; and use, for the second CC and based on the DCI, the one of the subset of TCI states in the first TCI pool for using the second mode on the second CC.

20. The apparatus of claim 19, wherein the DCI indicates the one of the subset of TCI states in the first TCI pool and the one of the subset of TCI states in the second TCI pool based on the DCI indicating the reference CC being configured with multi-timing advance group (TAG) for the first TRP and the second TRP, and wherein the one or more processors are configured to execute the instructions to cause the apparatus to use the one of the subset of TCI states in the first TCI pool for the second CC based on only the one of the subset of TCI states in the first TCI pool as indicated in the DCI.

21. The apparatus of claim 19, wherein the one or more processors are configured to execute the instructions to cause the apparatus to use the one of the subset of TCI states for the second CC based on translating a code point from the DCI indicated for the reference CC to the one of the subset of TCI states in the first TCI pool for the second CC.

22. An apparatus for wireless communication, comprising:

a transceiver;

a memory configured to store instructions; and one or more processors communicatively coupled with the memory and the transceiver, wherein the one or more processors are configured to execute the instructions to cause the apparatus to:

transmit a reference component carrier (CC) configuration for a reference CC based on a first set of transmission/reception points (TRPs) including one or more of a first TRP or a second TRP;

transmit a second CC configuration for a second CC based on a second set of TRPs including one or more of the first TRP or the second TRP;

transmit, for the reference CC, a transmission configuration indicator (TCI) pool configuration for using the reference CC in a first mode, wherein the TCI pool configuration includes one or more TCI pools for at least one of the first TRP or the second TRP; and configure, for the second CC, at least a subset of one of the one or more TCI pools, wherein the second CC uses a second mode that is different from the first mode, wherein the first mode and the second mode are each associated with a number of TCI pools, and wherein configuring at least the subset of one of the one or more TCI pools for the second CC is based on the first mode being associated with multiple downlink control information (DCI) and the second mode not being associated with single DCI.

23. The apparatus of claim 22, wherein the second mode is associated with a different number of TCI pools than the first mode for using the reference CC.

24. The apparatus of claim 23, wherein the first mode relates to using multiple TCI pools, wherein the second mode is associated with one TCI pool in the subset of TCI pools, and wherein the one or more processors are configured to execute the instructions to cause the apparatus to configure the second CC, based on the TCI pool configuration received for the reference CC, with the one TCI pool.

25. The apparatus of claim 23, wherein the one or more processors are configured to execute the instructions to cause the apparatus to:

transmit an activation command to activate a subset of TCI states from each of a set of multiple TCI pools for the reference CC, wherein the TCI pool configuration for the first mode includes the multiple TCI pools; and activate, for the second CC and based on the activation command, at least a portion of the subset of TCI states that are from the one TCI pool, wherein the second CC is configured with only the one TCI pool.

26. The apparatus of claim 25, wherein the one or more processors are configured to execute the instructions to cause the apparatus to transmit, for the second CC, a second TCI pool configuration including only the one TCI pool for the second mode, wherein the one or more processors are configured to execute the instructions to cause the apparatus to configure the second CC with only the one TCI pool.

27. The apparatus of claim 25, wherein the one or more processors are configured to execute the instructions to cause the apparatus to refrain from including, in the activation command, a first set of one or more TCI states associated with a first set of multiple TRPs where a second set of one or more TCI states in the activation command is associated with a second set of at least one TRP.

28. The apparatus of claim 25, wherein the one or more processors are configured to execute the instructions to cause the apparatus to refrain from transmitting multiple downlink control information (DCI) for TCI state indication for a first set of TCI states associated with a first set of multiple TRPs that indicates a TCI state for a second set of at least one TRP that uses a single DCI for TCI state indication.

29. An apparatus for wireless communication, comprising:

a transceiver;

a memory configured to store instructions; and one or more processors communicatively coupled with the memory and the transceiver, wherein the one or more processors are configured to execute the instructions to cause the apparatus to:

transmit a reference component carrier (CC) configuration for a reference CC based on a first set of transmission/reception points (TRPs) including one or more of a first TRP or a second TRP;

transmit a second CC configuration for a second CC based on a second set of TRPs including one or more of the first TRP or the second TRP;

transmit, for the reference CC, an activation command to activate a subset of transmission configuration indicator (TCI) states in at least one of a first TCI pool or a second TCI pool for at least one of the first TRP or the second TRP for using a first mode on the reference CC, wherein the activation command indicates to activate a subset of TCI states in both of the first TCI pool and the second TCI pool based on the reference CC being configured with the first TCI pool and the second TCI pool; and activate, for the second CC and based on the activation command, at least a subset of TCI states in the first TCI pool, wherein the second CC uses a second mode that is different from the first mode, wherein activate at least the subset of TCI states for the second CC including only the TCI states indicated in the activation command that are in the first TCI pool.

* * * * *